(12) United States Patent
Chen

(10) Patent No.: US 7,529,312 B2
(45) Date of Patent: May 5, 2009

(54) LAYERED MODULATION FOR TERRESTRIAL ATSC APPLICATIONS

(75) Inventor: Ernest C. Chen, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 627 days.

(21) Appl. No.: 10/693,135

(22) Filed: Oct. 24, 2003

(65) Prior Publication Data

US 2004/0091059 A1  May 13, 2004

Related U.S. Application Data

(60) Provisional application No. 60/421,327, filed on Oct. 25, 2002.

(51) Int. Cl.
*H03C 5/00* (2006.01)

(52) U.S. Cl. .................................. 375/269; 375/265

(58) Field of Classification Search .............. 375/265, 375/295, 299, 316, 340, 349, 269
See application file for complete search history.

(56) References Cited

U.S. PATENT DOCUMENTS

| | | | |
|---|---|---|---|
| 3,076,180 A | 1/1963 | Havens et al. | |
| 3,383,598 A | 5/1968 | Sanders | |
| 3,878,468 A | 4/1975 | Falconer et al. | |
| 3,879,664 A | 4/1975 | Monsen | |
| 3,974,449 A | 8/1976 | Falconer | |
| 4,039,961 A | 8/1977 | Ishio et al. | |
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,422,175 A | 12/1983 | Bingham et al. | |

(Continued)

FOREIGN PATENT DOCUMENTS

DE  3642213  12/1986

(Continued)

OTHER PUBLICATIONS

The Authoritive Dictionary of IEEE Standards Terms; Seventh Edition, pp. 1047—definition of "signal".

(Continued)

*Primary Examiner*—Emmanuel Bayard

(57) ABSTRACT

Systems and methods are disclosed for applying layered modulation to an 8-VSB signal as used in the Advanced Television Systems Committee (ATSC) digital television signal. A system for transmitting the layered signal includes a first antenna for transmitting an upper layer signal comprising an 8-VSB signal and a second antenna for transmitting a lower layer signal. A layered modulation signal comprises the upper layer signal and the lower layer signal both interfering in a common frequency band. At least one receiver demodulates the upper layer signal directly from the layered modulation signal and demodulates the lower layer signal after subtracting the upper layer signal from the layered modulation signal. The second antenna can have a selectively limited range so that the lower layer signal does not interfere with the upper layer signal in a range where the lower layer signal could not be demodulated.

28 Claims, 11 Drawing Sheets

U.S. PATENT DOCUMENTS

| | | |
|---|---|---|
| 4,484,337 A | 11/1984 | Leclert et al. |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |
| 4,637,017 A | 1/1987 | Assal et al. |
| 4,647,873 A | 3/1987 | Beckner et al. |
| 4,654,863 A | 3/1987 | Belfield et al. |
| 4,670,789 A | 6/1987 | Plume |
| 4,709,374 A | 11/1987 | Farrow |
| 4,800,573 A | 1/1989 | Cupo |
| 4,829,543 A | 5/1989 | Borth et al. |
| 4,835,790 A | 5/1989 | Yoshida et al. |
| 4,847,864 A | 7/1989 | Cupo |
| 4,860,315 A | 8/1989 | Hosoda et al. |
| 4,878,030 A | 10/1989 | Vincze |
| 4,896,369 A | 1/1990 | Adams et al. |
| 4,918,708 A | 4/1990 | Pottinger et al. |
| 4,993,047 A | 2/1991 | Moffat et al. |
| 5,043,734 A | 8/1991 | Niho |
| 5,088,110 A | 2/1992 | Bonnerot et al. |
| 5,111,155 A | 5/1992 | Keate et al. |
| 5,121,414 A | 6/1992 | Levine et al. |
| 5,199,047 A | 3/1993 | Koch |
| 5,206,889 A | 4/1993 | Unkrich |
| 5,221,908 A | 6/1993 | Katz et al. |
| 5,229,765 A | 7/1993 | Gardner |
| 5,233,632 A | 8/1993 | Baum et al. |
| 5,237,292 A | 8/1993 | Chethik |
| 5,285,480 A | 2/1994 | Chennakeshu et al. |
| 5,317,599 A | 5/1994 | Obata |
| 5,329,311 A | 7/1994 | Ward et al. |
| 5,337,014 A | 8/1994 | Najle et al. |
| 5,353,307 A | 10/1994 | Lester et al. |
| 5,412,325 A | 5/1995 | Meyers |
| 5,430,770 A | 7/1995 | Abbey |
| 5,450,623 A | 9/1995 | Yokoyama et al. |
| 5,467,197 A | 11/1995 | Hoff |
| 5,471,508 A | 11/1995 | Koslov |
| 5,493,307 A | 2/1996 | Tsujimoto |
| 5,513,215 A | 4/1996 | Marchetto et al. |
| 5,555,257 A | 9/1996 | Dent |
| 5,577,067 A | 11/1996 | Zimmerman |
| 5,577,087 A | 11/1996 | Furuya |
| 5,579,344 A | 11/1996 | Namekata |
| 5,581,229 A | 12/1996 | Hunt |
| 5,592,481 A | 1/1997 | Wiedeman et al. |
| 5,602,868 A | 2/1997 | Wilson |
| 5,603,084 A | 2/1997 | Henry et al. |
| 5,606,286 A | 2/1997 | Bains |
| 5,608,331 A | 3/1997 | Newberg et al. |
| 5,625,640 A | 4/1997 | Palmer et al. |
| 5,642,358 A | 6/1997 | Dent |
| 5,644,592 A | 7/1997 | Divsalar et al. |
| 5,648,955 A | 7/1997 | Jensen et al. |
| 5,732,113 A | 3/1998 | Schmidl et al. |
| 5,793,818 A | 8/1998 | Claydon et al. |
| 5,815,531 A | 9/1998 | Dent |
| 5,819,157 A | 10/1998 | Ben-Efraim et al. |
| 5,828,710 A | 10/1998 | Beale |
| 5,848,060 A | 12/1998 | Dent |
| 5,870,439 A | 2/1999 | Ben-Efraim et al. |
| 5,870,443 A | 2/1999 | Rahnema |
| 5,937,004 A | 8/1999 | Fasulo, II et al. |
| 5,940,025 A | 8/1999 | Koehnke et al. |
| 5,940,750 A | 8/1999 | Wang |
| 5,946,625 A | 8/1999 | Hassan et al. |
| 5,952,834 A | 9/1999 | Buckley |
| 5,956,373 A | 9/1999 | Goldston et al. |
| 5,960,040 A | 9/1999 | Cai et al. |
| 5,963,845 A | 10/1999 | Floury et al. |
| 5,966,048 A | 10/1999 | Thompson |
| 5,966,186 A | 10/1999 | Shigihara et al. |
| 5,966,412 A | 10/1999 | Ramaswamy |
| 5,970,098 A | 10/1999 | Herzberg |
| 5,970,156 A | 10/1999 | Hummelgaard et al. |
| 5,970,429 A | 10/1999 | Martin |
| 5,978,652 A | 11/1999 | Burr et al. |
| 5,987,068 A | 11/1999 | Cassia et al. |
| 5,987,069 A | 11/1999 | Furukawa et al. |
| 5,995,832 A | 11/1999 | Mallinckrodt |
| 5,999,793 A | 12/1999 | Ben-Efraim et al. |
| 6,008,692 A | 12/1999 | Escartin |
| 6,018,556 A | 1/2000 | Janesch et al. |
| 6,021,159 A | 2/2000 | Nakagawa |
| 6,028,894 A | 2/2000 | Oishi et al. |
| 6,032,026 A | 2/2000 | Seki et al. |
| 6,034,952 A | 3/2000 | Dohi et al. |
| 6,049,566 A | 4/2000 | Saunders et al. |
| 6,052,586 A | 4/2000 | Karabinis |
| 6,055,278 A | 4/2000 | Ho et al. |
| 6,061,393 A | 5/2000 | Tsui et al. |
| 6,072,841 A | 6/2000 | Rahnema |
| 6,084,919 A | 7/2000 | Kleider et al. |
| 6,104,747 A | 8/2000 | Jalloul et al. |
| 6,108,374 A | 8/2000 | Balachandran et al. |
| 6,125,148 A | 9/2000 | Frodigh et al. |
| 6,125,260 A | 9/2000 | Wiedeman et al. |
| 6,128,357 A | 10/2000 | Lu et al. |
| 6,131,013 A | 10/2000 | Bergstrom et al. |
| 6,134,282 A | 10/2000 | Ben-Efraim et al. |
| 6,140,809 A | 10/2000 | Doi |
| 6,141,534 A | 10/2000 | Snell et al. |
| 6,144,708 A | 11/2000 | Maruyama |
| 6,166,601 A | 12/2000 | Shalom et al. |
| 6,177,836 B1 | 1/2001 | Young et al. |
| 6,178,158 B1 | 1/2001 | Suzuki et al. |
| 6,188,717 B1 | 2/2001 | Kaiser et al. |
| 6,192,088 B1 | 2/2001 | Aman et al. |
| 6,212,360 B1 | 4/2001 | Fleming et al. |
| 6,219,095 B1 | 4/2001 | Zhang et al. |
| 6,246,717 B1 | 6/2001 | Chen et al. |
| 6,249,180 B1 | 6/2001 | Maalej et al. |
| 6,266,534 B1 | 7/2001 | Raith et al. |
| 6,272,679 B1 | 8/2001 | Norin |
| 6,275,678 B1 | 8/2001 | Bethscheider et al. |
| 6,297,691 B1 | 10/2001 | Anderson et al. |
| 6,304,594 B1 | 10/2001 | Salinger |
| 6,307,435 B1 | 10/2001 | Nguyen et al. |
| 6,314,441 B1 | 11/2001 | Raghunath |
| 6,320,464 B1 | 11/2001 | Suzuki et al. |
| 6,320,919 B1 | 11/2001 | Khyrallah et al. |
| 6,325,332 B1 | 12/2001 | Cellier et al. |
| 6,330,336 B1 | 12/2001 | Kasama |
| 6,333,924 B1 | 12/2001 | Porcelli et al. |
| 6,335,951 B1 | 1/2002 | Cangiani et al. |
| 6,366,309 B1 | 4/2002 | Siegle |
| 6,369,648 B1 | 4/2002 | Kirkman |
| 6,377,116 B1 | 4/2002 | Mattsson et al. |
| 6,389,002 B1 | 5/2002 | Schilling |
| 6,411,659 B1 | 6/2002 | Liu et al. |
| 6,411,797 B1 | 6/2002 | Estinto |
| 6,426,822 B1 | 7/2002 | Winter et al. |
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Dietmar et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,574,235 B1 * | 6/2003 | Arslan et al. ................ 370/464 |

| | | |
|---|---|---|
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,731,622 B1 | 5/2004 | Frank et al. |
| 6,731,700 B1 | 5/2004 | Yakhnich et al. |
| 6,741,662 B1 | 5/2004 | Francos et al. |
| 6,745,050 B1 | 6/2004 | Forsythe et al. |
| 6,772,182 B1 | 8/2004 | McDonald et al. |
| 6,775,521 B1 | 8/2004 | Chen |
| 6,795,496 B1 | 9/2004 | Soma et al. |
| 6,809,587 B2 | 10/2004 | Ghannouchi et al. |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 | 10/2005 | Linsky et al. |
| 6,970,496 B1 | 11/2005 | Ben-Bassat et al. |
| 6,980,609 B1 | 12/2005 | Ahn |
| 6,990,627 B2 | 1/2006 | Uesugi et al. |
| 6,999,510 B2 | 2/2006 | Batruni |
| 7,041,406 B2 | 5/2006 | Schuler et al. |
| 7,073,116 B1 | 7/2006 | Settle et al. |
| 7,079,585 B1 | 7/2006 | Settle et al. |
| 7,154,958 B2 | 12/2006 | Dabak et al. |
| 7,161,931 B1 | 1/2007 | Li et al. |
| 7,173,981 B1 | 2/2007 | Chen et al. |
| 7,184,473 B2 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 2001/0012322 A1 | 8/2001 | Nagaoka et al. |
| 2001/0016926 A1 | 8/2001 | Riggle |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0051435 A1 | 5/2002 | Giallorenzi et al. |
| 2002/0071506 A1 | 6/2002 | Lindquist et al. |
| 2002/0082792 A1 | 6/2002 | Bourde et al. |
| 2002/0136327 A1 | 9/2002 | El-Gamal et al. |
| 2002/0154705 A1 | 10/2002 | Walton et al. |
| 2002/0158619 A1 | 10/2002 | Chen |
| 2002/0172296 A1 | 11/2002 | Pilcher |
| 2002/0176516 A1 | 11/2002 | Jeske et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0138040 A1 | 7/2003 | Rouphael et al. |
| 2003/0147472 A1 | 8/2003 | Bach et al. |
| 2003/0185310 A1 | 10/2003 | Ketchum et al. |
| 2003/0194022 A1 | 10/2003 | Hammons et al. |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1* | 1/2006 | Chen .......................... 375/297 |
| 2006/0056541 A1 | 3/2006 | Chen et al. |
| 2007/0011716 A1 | 1/2007 | Koslov et al. |
| 2007/0121718 A1 | 5/2007 | Wang et al. |

FOREIGN PATENT DOCUMENTS

| | | |
|---|---|---|
| EP | 0115218 | 8/1984 |
| EP | 0222076 | 8/1986 |
| EP | 0238822 | 9/1987 |
| EP | 0356096 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1335512 | 8/2003 |
| FR | 2696295 | 4/1994 |
| FR | 2724522 | 3/1996 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 07-038615 | 2/1995 |
| JP | 2001-244832 | 9/2001 |
| JP | 2002118611 | 4/2002 |
| WO | WO 99/00957 | 1/1999 |
| WO | WO 99/20001 | 4/1999 |
| WO | WO 99/23718 | 5/1999 |
| WO | 1999033203 | 7/1999 |
| WO | 0079708 | 12/2000 |
| WO | 0079753 A1 | 12/2000 |
| WO | 0113532 A1 | 2/2001 |
| WO | WO 01/19013 | 3/2001 |
| WO | WO 01/39456 | 5/2001 |
| WO | WO 02/073817 | 9/2002 |
| WO | WO 2005/074171 | 8/2005 |
| WO | WO 2005/086444 | 9/2005 |

OTHER PUBLICATIONS

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Meyr, Heinrich et al.; "Digital Communication Receivers: Synchronization, Channel Estimation, and Signal Processing"; 1998, John Wiley & Sons, Inc.; pp. 212-213 and 217-218; XP002364874.

Meyr, Heinrich et al.; "Digital Communication Receivers: Synchronization, Channel Estimation, and Signal Processing"; 1998, John Wiley & Sons, Inc.; pp. 610-612; XP002364876.

Fant, T. et al.; "Fourth-Power Law Clock Recovery with Prefiltering"; Proceedings of the International Conference on Communications (ICC); Geneva; May 23-26, 1993; New York; IEEE; US; vol. 3; May 23, 1993; pp. 811-815 XP010137089, ISBN: 0-7803-0950-2; Section I, Introduction.

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Palicot, J., Veillard, J.; "Possible Coding and Modulation Approaches to Improve Service Availability for Digital FDTV Satellite Broadcasting at 22 GHz"; IEEE Transactions on Consumer Electronics; vol. 39, Issue 3; Aug. 1993; pp. 660-667.

U.S. Appl. No. 10/692,491, filed Oct. 24, 2003.

Combarel, L. et al.; HD-SAT Modems for the Satekkite Broadcasting in the 20 GHz Frequency Band; IEEE Transactions on Consumer Electronics; vol. 41, Issue 4; Nov. 1995; pp. 991-999.

U.S. Appl. No. 10/519,375, filed Dec. 22, 2004, inventor Ernest C. Chen, Non-final Communication dated Dec. 27, 2007.

U.S. Appl. No. 10/913,927, filed Aug. 5, 2004, inventor Ernest C. Chen, Non-final Communication dated Dec. 11, 2007.

U.S. Appl. No. 11/619,173, filed Jan. 2, 2007, inventor Ernest C. Chen, Non-final Communication dated Nov. 15, 2007.

U.S. Appl. No. 10/532,631, filed Apr. 25, 2005, inventor Paul R. Anderson, Non-final Communication dated Nov. 19, 2007.

U.S. Appl. No. 10/691,032, filed Oct. 22, 2003, inventor Weizheng Wang, Non-final Communication dated Nov. 16, 2007.

U.S. Appl. No. 10/519,322, filed Dec. 23, 2004, inventor Ernest C. Chen, Notice of Allowance dated Dec. 11, 2007.

U.S. Appl. No. 10/532,619, filed Apr. 25, 2005, inventor Ernest C. Chen, Notice of Allowance dated Dec. 26, 2007.

U.S. Appl. No. 11/603,776, filed Nov. 22, 2006, inventor Ernest C. Chen, Notice of Allowance dated Jan. 2, 2008.

U.S. Appl. No. 10/962,346, filed Oct. 8, 2004, inventor Ernest C. Chen, Non-final Communication dated Oct. 16, 2007.

Scott, R. P. et al.; Ultralow Phase Noise Ti:sapphire Laser Rivals 100 MHz Crystal Oscillator; Nov. 11-15, 2001; IEEE-Leos; pp. 1-2.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

Arslan, H. et al.; "Co-channel Interference Cancellation with Successive Cancellation in Narrowband TDMA Systems"; Wireless Communications and Networking Conference; 2000; WCNC; 2000 IEEE; Sep. 23-28, 2000; Piscataway, NJ, USA; IEEE vol. 3; Sep. 23, 2000; pp. 1070-1074; XP010532692; ISBN: 0-7803-6596-8; Chapters I and III.

Non-final Communication dated Dec. 27, 2007 in U.S. Appl. No. 10/519,375 filed Dec. 22, 2004 by Ernest C. Chen et al.

Non-final Communication dated Dec. 11, 2007 in U.S. Appl. No. 10/913,927 filed Aug. 5, 2004 by Ernest C. Chen.

Non-final Communication dated Nov. 15, 2007 in U.S. Appl. No. 11/619,173 filed Jan. 2, 2007 by Ernest C. Chen et al.

Non-final Communication dated Nov. 19, 2007 in U.S. Appl. No. 10/532,631 filed Apr. 25, 2005 by Paul R. Anderson et al.

Non-final Communication dated Nov. 16, 2007 in U.S. Appl. No. 10/691,032 filed Oct. 22, 2003 by Weizheng Wang et al.

Notice of Allowance dated Dec. 11, 2007 in U.S. Appl. No. 10/519,322 filed Dec. 23, 2004 by Ernest C. Chen et al.

Notice of Allowance dated Dec. 26, 2007 in U.S. Appl. No. 10/532,619 filed Apr. 25, 2005 by Ernest C. Chen.

Notice of Allowance dated Jan. 2, 2008 in U.S. Appl. No. 11/603,776 filed Nov. 22, 2006 by Ernest C. Chen et al.

Non-final Communication dated May 31, 2007 in U.S. Appl. No. 10/692,539 filed Oct. 24, 2003 by Ernest C. Chen.

Notice of Allowance dated Sep. 20, 2007 in U.S. Appl. No. 10/692,539 filed Oct. 24, 2003 by Ernest C. Chen.

Non-final Communication dated Oct. 1, 2007 in U.S. Appl. No. 11/655,001 filed Jan. 18, 2007 by Weizheng Wang et al.

Non-final Communication dated Oct. 1, 2007 in U.S. Appl. No. 11/653,517 filed Jan. 16, 2007 by Ernest C. Chen.

Non-final Communication dated Sep. 28, 2007 in U.S. Appl. No. 10/961,579 filed Oct. 8, 2004 by Ernest C. Chen.

Notice of Allowance dated Jan. 7, 2008 in U.S. Appl. No. 10/532,632 filed Apr. 25, 2005 by Ernest C. Chen et al.

Non-final Communication dated Mar. 3, 2008 in U.S. Appl. No. 11/656,662 filed Jan. 22, 2007 by Ernest C. Chen et al.

Notice of Allowance dated Mar. 25, 2008 in U.S. Appl. No. 11/653,517 filed Jan. 16, 2007 by Ernest C. Chen.

EPO Communication dated Mar. 11, 2008 in European counterpart Application No. 03777694.5 of corresponding U.S. Appl. No. 10/532,509 filed Oct. 17, 2003 by Ernest Chen et al., now issued as U.S. Appl. No. 7,230,480.

EPO Communication dated Mar. 7, 2008 in European counterpart Application No. 03742393.6 of corresponding U.S. Appl. No. 10/519,375 filed Jul. 3, 2003 by Ernest Chen et al.

Canadian Office Action dated Sep. 12, 2007 in Canadian counterpart Application No. 2491259 of corresponding U.S. Appl. No. 10/519,375 filed Jul. 3, 2003 by Ernest C. Chen et al.

Norwegian Office Action dated Nov. 15, 2007 in Norwegian counterpart Application No. 20026115 of corresponding U.S. Appl. No. 09/844,401 filed Apr. 27, 2001 by Ernet C. Chen, now U.S. Appl. No. 7,209,524.

EPO Communication dated Aug. 3, 2007 in European counterpart application No. 03794510.2 of corresponding U.S. Appl. No. 10/236,414 filed Sep. 6, 2002 by Ernest C. Chen et al.

Non-final Office Communication dated Oct. 16, 2007 in U.S. Appl. No. 10/962,346 filed Oct. 8, 2004 by Ernest Chen.

Non-final Office Communication dated Apr. 1, 2008 in U.S. Appl. No. 10/961,579 filed Oct. 8, 2004 filed by Ernest C. Chen.

Notice of Allowance dated May 6, 2008 in U.S. Appl. No. 10/532,631 filed Apr. 25, 2005 by Paul R. Anderson et al.

Non-final Office Action dated Apr. 30, 2008 in U.S. Appl. No. 10/962,246 filed Oct. 8, 2004 by Ernest Chen.

Notice of Allowance dated Apr. 30, 2008 in U.S. Appl. No. 11/603,776 filed Nov. 22, 2006 by Ernest Chen et al.

EPO Communication dated Apr. 4, 2008 in European counterpart Application No. 03757359.9 corresponding to U.S. Appl. No. 10/165,710 filed Jun. 7, 2002 by Ernest Chen.

Notice of Allowance dated Mar. 12, 2008 in U.S. Appl. No. 11/655,001 filed Jan. 18, 2007 by Weizheng Wang et al.

Japanese Office Action dated Mar. 4, 2008 in Japanese counterpart Application No. 2004-297297 corresponding to U.S. Appl. No. 10/962,346 filed Oct. 8, 2004 by Ernest Chen.

EPO Communication dated Feb. 26, 2008 in European counterpart Application No. 04256234.8 corresponding to U.S. Application No. 10/962,346 filed Oct. 8, 2004 by Ernest Chen.

EPO Communication dated Feb. 7, 2008 in European counterpart Application No. 03742400.9 and received from European representative on Feb. 14, 2008 and corresponding to U.S. Appl. No. 10/519,322 filed Dec. 23, 2004 by Ernest Chen et al.

Notice of Allowance dated May 8, 2008 in U.S. Appl. No. 11/619,173 filed Jan. 2, 2007 by Ernest Chen et al.

Notice of Allowance dated May 6, 2008 in U.S. Appl. No. 10/532,632 filed Apr. 25, 2005 by Ernest Chen et al.

Notice of Allowance dated Apr. 21, 2008 in U.S. Appl. No. 10/519,322 filed Dec. 23, 2004 by Ernest Chen et al.

Canadian Office Action dated Nov. 29, 2007 in Canadian counterpart Application No. 2442400 corresponding to U.S. Appl. No. 09/844,401 filed Apr. 27, 2001 by Ernest Chen, now issued Apr. 27, 2007 as U.S. Appl. No. 7,209,524.

EPO Summons to attend Oral Proceedings dated Jul.18, 2008 in European counterpart Application No. 02728894.3 corresponding to U.S. Appl. No. 09/844,401 filed Apr. 27, 2001 by Ernest Chen, now issued Apr. 24, 2007 as U.S. Appl. No. 7,209,524.

Taiwanese Office Action dated May 14, 2008 in Taiwan counterpart Application No. 092129629 corresponding to U.S. Appl. No. 10/532,631 filed Apr. 25, 2005 by Paul R. Anderson et al.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

EPO Communication dated May 6, 2008 in European counterpart Application No. 03774848.0 corresponding to U.S. Appl. No. 10/532.582 filed Apr. 25, 2005 by Ernest C. Chen et al., now issued Feb. 6, 2007 as U.S. Appl. No. 7,173,977.

EPO Communication dated May. 6, 2008 in European counterpart Application No. 03777627.5 corresponding to U.S. Appl. No. 10/532,619 filed Apr. 25, 2005 by Ernest C. Chen.

Notice of Allowance dated May 22, 2008 in U.S. Appl. No. 10/532,619 filed Apr. 25, 2005 by Ernest C. Chen.

Final Rejection dated Jun. 24, 2008 in U.S. Appl. No. 10/519,375 filed Dec. 22, 2004 by Ernest C. Chen et al.

Non-Final Office Action dated Jun. 17, 2008 in U.S. Appl. No. 10/913,927 filed Aug. 5, 2004 by Ernest C. Chen.

European Search Report and Search Opinion dated Jun. 13, 2008 in European counterpart Application No. 07075745.5 corresponding to U.S. Appl. No. 09/844,401 filed Apr. 27, 2001 by Ernest C. Chen, now issued Apr. 24, 2007 as U.S. Appl. No. 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalart, Pascal; Leclerc, Michel; Fortier, Paul; Huynh Huu Tue; "Performance Analysis of a COFDM/FM In-band Digital Audio Broadcastin System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

Canadian Office Action dated Apr. 22, 2008 in Canadian counterpart Application No. 250294 corresponding to U.S. Appl. No. 10/532,619 filed Apr. 25, 2005 by Ernest C. Chen.

Notice of Allowance dated Jun. 13, 2008 in U.S. Appl. No. 10/532,524 filed Apr. 25, 2005 by Ernest C. Chen et al.

Final Rejection dated Sep. 9, 2008 in U.S. Appl. No. 11/656,662 filed Jan. 22, 2007 by Ernest C. Chen et al.

Canadian Office Action dated Aug. 5, 2008 in Canadian counterpart Application No. 2503532 corresponding to U.S. Appl. No. 10/532,509 filed Oct. 17, 2003 by Ernest C. Chen et al., now issued Jun. 12, 2007 as U.S. Appl. No. 7,230,480.

Canadian Office Action dated Jan. 22, 2008 in Canadian counterpart Application No. 2487817 corresponding to U.S. Appl. No. 10/165,710 filed Jun. 7, 2002 by Ernest C. Chen.

Canadian Office Action dated Jan. 23, 2008 in Canadian counterpart Application No. 2484313 corresponding to U.S. Appl. No. 10/962,346 filed Oct. 8, 2004 by Ernest C. Chen.

Canadian Office Action dated Feb. 5, 2006 in Canadian counterpart Application No. 2503530 corresponding to U.S. Appl. No. 10/532,632 filed Apr. 25, 2005 by Ernest C. Chen et al.

Canadian Office Action dated in Canadian counterpart Application No. 2515167 corresponding to U.S. Appl. No. 10/913,927 filed Aug. 5, 2004 by Ernest C. Chen.

Notice of Allowance dated Jun. 2, 2008 in U.S. Appl. No. 10/691,032 filed Oct. 22, 2003 by Weizheng Wang et al.

Non-final Office Action dated Apr. 30, 2008 in U.S. Appl. No. 10/962,346 filed Oct. 8, 2004 by Ernest C. Chen.

Non-final Office Action dated Dec. 16, 2008 in U.S. Appl. No. 12/176,533 filed Jul. 21, 2008 by Ernest C. Chen et al.

Chinese Office Action dated Aug. 22, 2008 in Chinese Patent Application No. 200410100591.6 filed Oct. 10, 2004 by Ernest Chen.

Notice of Allowance dated Oct. 23, 2008 in U.S. Appl. No. 10/961,579 filed Oct. 8, 2004 by Ernest C. Chen.

Notice of Allowance dated Oct. 23, 2008 in U.S. Appl. No. 10/962,346 filed Oct. 8, 2004 by Ernest C. Chen.

EPO Communication dated Oct. 17, 2008 in European Patent Application No. 03774848.0 filed Oct. 15, 2003 by Ernest Chen et al.

EPO Communication dated Nov. 18, 2008 in European Patent Application No. 03742393.6 filed Jul. 3, 2003 by Ernest Chen et al.

Non-final Office Action dated Dec. 3, 2008 in U.S. Appl. No. 10/913,927 filed Aug. 5, 2004 filed by Ernest Chen.

Notice of Allowance dated Dec. 2, 2008 in U.S. Appl. No. 11/656,662 filed Jan. 22, 2007 by Ernest Chen et al.

* cited by examiner

LAYERED MODULATION FOR TERRESTRIAL ATSC APPLICATIONS

CROSS-REFERENCE TO RELATED APPLICATIONS

This application claims the benefit of U.S. Provisional Patent Application No. 60/421,327, entitled "LAYERED MODULATION FOR ATSC APPLICATIONS," by Ernest C. Chen, filed Oct. 25, 2002.

This application is also a continuation-in-part application of the following co-pending and commonly-assigned U.S. utility patent application, which applications is incorporated by reference herein:

U.S. Utility application Ser. No. 09/844,401, filed Apr. 27, 2001, by Ernest C. Chen, entitled "LAYERED MODULATION FOR DIGITAL SIGNALS."

Application Ser. No. 11/653,517, entitled "LAYERED MODULATION FOR DIGITAL SIGNALS," filed on Jan. 16, 2007, by Ernest C. Chen, which is a continuation of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/165,710, entitled "SATELLITE TWTA ON-LINE NON-LINEARITY MEASUREMENT," filed on Jun. 7, 2002, by Ernest C. Chen, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/236,414, entitled "SIGNAL, INTERFERENCE AND NOISE POWER MEASUREMENT," filed on Sep. 6, 2002, by Ernest C. Chen and Chinh Tran, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/913,927, entitled "CARRIER TO NOISE RATIO ESTIMATIONS FROM A RECEIVED SIGNAL," filed on Aug. 5, 2004, by Ernest C. Chen, which is a continuation in part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/619,173, entitled "PREPROCESSING SIGNAL LAYERS IN LAYERED MODULATION DIGITAL SIGNAL SYSTEM TO USE LEGACY RECEIVERS," filed Jan. 2, 2007, which is a continuation of application Ser. No. 10/068,039, entitled "PREPROCESSING SIGNAL LAYERS IN LAYERED MODULATION DIGITAL SIGNAL SYSTEM TO USE LEGACY RECEIVERS," filed on Feb. 5, 2002, by Ernest C. Chen, Tiffany S. Furuya, Philip R. Hilmes, and Joseph Santoru now issued as U.S. Pat. No. 7,245,671, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/693,421, entitled "FAST ACQUISITION OF TIMING AND CARRIER FREQUENCY FROM RECEIVED SIGNAL," filed on Oct. 24, 2003, by Ernest C. Chen, now issued as U.S. Pat. No. 7,151,807, which claims priority to Provisional Patent Application Ser. No. 60/421,292, filed Oct. 25, 2002, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/692,491, entitled "ONLINE OUTPUT MULTIPLEXER FILTER MEASUREMENT," filed on Oct. 24, 2003, by Ernest C. Chen, which claims priority to Provisional Patent Application 60/421,290, filed Oct. 25, 2002, and which is a continuation-in-part of application Ser. No. 09/844,401, entitled "LAYERED MODULATION FOR DIGITAL SIGNALS," filed on Apr. 27,2001, by Ernest C. Chen, now issued as U.S. Pat. No. 7,209,524;

Application Ser. No. 11/603,776, entitled "DUAL LAYER SIGNAL PROCESSING IN A LAYERED MODULATION DIGITAL SIGNAL SYSTEM," filed on Nov. 22, 2006, by Ernest C. Chen, Tiffany S. Furaya, Philip R. Hilmes, and Joseph Santoru, which is a continuation of application Ser. No. 10/068,047, entitled "DUAL LAYER SIGNAL PROCESSING IN A LAYERED MODULATION DIGITAL SIGNAL SYSTEM;" filed on Feb. 5, 2002, by Ernest C. Chen, Tiffany S. Furaya, Philip R. Hilmes, and Joseph Santoru, now issued as U.S. Pat. No. 7,173,981, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/691,032, entitled "UNBLIND EQUALIZER ARCHITECTURE FOR DIGITAL COMMUNICATION SYSTEMS," filed on Oct. 22, 2003, by Weizheng W. Wang, Tung-Sheng Lin, Ernest C. Chen, and William C. Lindsey, which claims priority to Provisional Patent Application Ser. No. 60/421,329, filed Oct. 25, 2002, and which is a continuation-in-part of application Ser. No.09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/962,346, entitled "COHERENT AVERAGING FOR MEASURING TRAVELING WAVE TUBE AMPLIFIER NONLINEARITY," filed on Oct. 8, 2004, by Ernest C. Chen, which claims priority to Provisional Patent Application Ser. No. 60/510,368, filed October 10, 2003, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/655,001, entitled "AN OPTIMIZATION TECHNIQUE FOR LAYERED MODULATION," filed on Jan. 18, 2007, by Weizheng W. Wang, Guancai Zhou, Tung-Sheng Lin, Ernest C. Chen, Joseph Santoru, and William Lindsey, which claims priority to Provisional Patent Application 60/421,293, filed Oct. 25, 2002, and which is a continuation of Application Ser. No. 10/693,140, entitled "OPTIMIZATION TECHNIQUE FOR LAYERED MODULATION," filed on Oct. 24, 2003, by Weizheng W. Wang, Guancai Zhou, Tung-Sheng Lin, Ernest C. Chen, Joseph Santoru, and William Lindsey, now issued as U.S. Pat. No. 7,184, 489, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 11/656,662, entitled "EQUALIZERS FOR LAYERED MODULATION AND OTHER SIGNALS," filed on Jan. 22, 2007, by Ernest C. Chen, Tung-Sheng Lin, Weizheng W. Wang, and William C. Lindsey, which claims priority to Provisional Patent Application 60/421,241, filed Oct. 25, 2002, and which is a continuation of application Ser. No. 10/691,133, entitled "EQUALIZERS FOR LAYERED MODULATED AND OTHER SIGNALS,"

filed on Oct. 22, 2003, by Ernest C. Chen, Tung-Sheng Lin, Weizheng W. Wang, and William C. Lindsey, now issued as U.S. Pat. No. 7,184,473, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/961,579, entitled "EQUALIZATION FOR TWTA NONLINEARITY MEASUREMENT" filed on Oct. 8, 2004, by Ernest C. Chen, which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,632, entitled "LOWER COMPLEXITY LAYERED MODULATION SIGNAL PROCESSOR," filed on Apr. 25, 2005, by Ernest C. Chen, Weizheng W. Wang, Tung-Sheng Lin, Guangcai Zhou, and Joseph Santoru, which is a National Stage Application of PCT US03/32264, filed Oct. 10, 2003, which claims priority to Provisional Patent Application 60/421,331, entitled "LOWER COMPLEXITY LAYERED MODULATION SIGNAL PROCESSOR," filed Oct. 25, 2002, by Ernest C. Chen, Weizheng W. Wang, Tung-Sheng Lin, Guangcai Zhou, and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,631, entitled "FEEDER LINK CONFIGURATIONS TO SUPPORT LAYERED MODULATION FOR DIGITAL SIGNALS" filed on Apr. 25, 2005, by Paul R. Anderson, Joseph Santoru and Ernest C. Chen, which is a National Phase Application of PCT US03/33255, filed Oct. 20, 2003, which claims priority to Provisional Patent Application 60/421,328, entitled "FEEDER LINK CONFIGURATIONS TO SUPPORT LAYERED MODULATION FOR DIGITAL SIGNALS," filed Oct. 25, 2002, by Paul R. Anderson, Joseph Santoru and Ernest C. Chen, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,619, entitled "MAXIMIZING POWER AND SPECTRAL EFFICIENCIES FOR LAYERED AND CONVENTIONAL MODULATIONS," filed on Apr. 25, 2005, by Ernest C. Chen, which is a National Phase Application of PCT Application US03/32800, filed Oct. 16, 2003, which claims priority to Provisional Patent Application 60/421,288, entitled "MAXIMIZING POWER AND SPECTRAL EFFICIENCIES FOR LAYERED AND CONVENTIONAL MODULATION," filed Oct. 25, 2002, by Ernest C. Chen and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, Application Ser. No. 10/532,524, entitled "AMPLITUDE AND PHASE MATCHING FOR LAYERED MODULATION RECEPTION," filed on Apr. 25, 2005, by Ernest C. Chen, Jeng-Hong Chen, Kenneth Shum, and Joungheon Oh, which is a National Phase Application of PCT Application US03/31199, filed Oct. 3, 2003, which claims priority to Provisional Patent Application 60/421,332, entitled "AMPLITUDE AND PHASE MATCHING FOR LAYERED MODULATION RECEPTION" filed Oct. 25, 2002, by Ernest C. Chen, Jeng-Hong Chen, Kenneth Shum, and Joungheon Oh, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524, and also claims priority to;

Application Ser. No. 10/532,582, entitled "METHOD AND APPARATUS FOR TAILORING CARRIER POWER REQUIREMENTS ACCORDING TO AVAILABILITY IN LAYERED MODULATION SYSTEMS," filed on Apr. 25, 2005, by Ernest C. Chen, Paul R. Anderson and Joseph Santoru, now issued as U.S. Pat. No. 7,173,977, which is a National Stage Application of PCT Application US03/32751, filed Oct. 15, 2003, which claims priority to Provisional Patent Application 60/421,333, entitled "METHOD AND APPARATUS FOR TAILORING CARRIER POWER REQUIREMENTS ACCORDING TO AVAILABILITY IN LAYERED MODULATION SYSTEMS" filed Oct. 25, 2002, by Ernest C. Chen, Paul R. Anderson and Joseph Santoru, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/532,509, entitled "ESTIMATING THE OPERATING POINT ON A NONLINEAR TRAVELING WAVE TUBE AMPLIFIER," filed on Apr. 25, 2005, by Ernest C. Chen and Shamik Maitra, now issued as U.S. Pat. No. 7,230,480, which is a National Stage Application of PCT Application US03/33130 filed Oct. 17, 2003, and which claims priority to Provisional Patent Application 60/421,289, entitled "ESTIMATING THE OPERATING POINT ON A NONLINEAR TRAVELING WAVE TUBE AMPLIFIER," filed Oct. 25, 2002, by Ernest C. Chen and Shamik Maitra, and which is a continuation-in-part of application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,322, entitled "IMPROVING HIERARCHICAL 8PSK PERFORMANCE," filed on Dec. 23, 2004 by Ernest C. Chen and Joseph Santoru, which is a National Stage Application of PCT US03/020862 filed Jul. 1, 2003, which claims priority to Provisional Patent Application 60/392,861, filed Jul. 1, 2002 and Provisional Patent Application 60/392,860, filed Jul. 1, 2002, and which is also related to application Ser. No. 09/844,401, entitled "LAYERED MODULATION FOR DIGITAL SIGNALS," filed on Apr. 27, 2001, by Ernest C. Chen, now issued as U.S. Pat. No. 7,209,524;

Application Ser. No. 10/519,375, entitled "METHOD AND APPARATUS FOR LAYERED MODULATION," filed on Jul. 3, 2003, by Ernest C. Chen and Joseph Santoru, which is a National Stage Application of PCT US03/20847, filed Jul. 3, 2003, which claims priority to Provisional Patent Application 60/393,437 filed Jul. 3, 2002, and which is related to Application Ser. No. 09/844,401, entitled "LAYERED MODULATION FOR DIGITAL SIGNALS," filed on Apr. 27, 2001, by Ernest C. Chen, now issued as U.S. Pat. No. 7,209,524; and Application Ser. No. 10/692,539, entitled "ON-LINE PHASE NOISE MEASUREMENT FOR LAYERED MODULATION", filed Oct. 24, 2003, by Ernest C. Chen, which claims priority from Provisional Patent Application 60/421,291, filed Oct. 25, 2002, entitled "ON-LINE PHASE NOISE MEASUREMENT FOR LAYERED MODULATION".

BACKGROUND OF THE INVENTION

1. Field of the Invention

The present invention relates to systems and methods for transmitting digital signals in ATSC applications, particularly signals using layered modulations.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional frequency. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently (asynchronously) both upper and lower layer signals, can be employed to meet these needs. Such layered modulation systems allow higher information throughput with backwards compatibility. Even when backward compatibility is not required (such as with an entirely new system), layered modulation can still be advantageous because it requires a TWTA peak power significantly lower than that for a conventional 8PSK or 16QAM modulation format for a given throughput.

The Advanced Television Systems Committee, Inc., is an international, non-profit organization developing voluntary standards for digital television. The ATSC member organizations represent the broadcast, broadcast equipment, motion picture, consumer electronics, computer, cable, satellite, and semiconductor industries. The ATSC works to coordinate television standards among different communications media focusing on digital television, interactive systems, and broadband multimedia communications. ATSC also develops digital television implementation strategies and present educational seminars on the ATSC standards. ATSC Digital TV Standards include digital high definition television (HDTV), standard definition television (SDTV), data broadcasting, multichannel surround-sound audio, and satellite direct-to-home broadcasting.

For example, the terrestrial ATSC describes the characteristics of an RF/transmission subsystem, which is referred to as the VSB subsystem, of the Digital Television Standard. The VSB subsystem offers two modes: a terrestrial broadcast mode (8 VSB), and a high data rate mode (16 VSB). See "ATSC Standard: Digital Television Standard, Revision B with Amendments 1 and 2", The Advanced Television Systems Committee, May 19, 2003, which is incorporated by reference herein. In the ATSC standard for digital television and many other communications standards, the allocated frequency bandwidth cannot be increased. Given the stipulated ATSC modulation and coding techniques, the information throughput for ATSC is fixed over the channel bandwidth of 6 MHz.

Accordingly, there is a need for systems and methods that expand capacity of the allocated ATSC frequency bandwidth. As discussed hereafter, the present invention meets these needs.

SUMMARY OF THE INVENTION

Layered modulation transmits two or more signals simultaneously. The signals are layered in terms of power level and are generated non-coherently with respect to each other. Upon reception, these signals are processed into separate data transports for a combined throughput greater than that afforded by the conventional modulation method which allows only one layer of signal. Embodiments of the present invention utilize layered modulation to provide additional throughput over the ATSC signal band.

Like other layered modulation applications, embodiments of the invention allow a new service to be added to existing service while maintaining backward compatibility. Specifically, performance of the legacy ATSC service with existing receivers will be little affected, and little extra power will be required to transmit the legacy signal. The signal for the new service will be transmitted typically from a separate antenna. The maximum range of the new service will be shorter than that of the legacy service, as will become clear later in this document.

A typical transmission system of the invention includes a first antenna for transmitting an upper layer signal comprising an 8-VSB signal and a second antenna for transmitting a lower layer signal. A layered modulation signal comprises the upper layer signal and the lower layer signal both interfering in a common frequency band. At least one receiver demodulates the upper layer signal directly from the layered modulation signal and demodulates the lower layer signal after subtracting the upper layer signal from the layered modulation signal. The second antenna can have a selectively limited range so that the lower layer signal does not interfere with the upper layer signal in a range where the lower layer signal could not be demodulated.

The selectively limited range can be produced by reducing a second antenna height relative to a first antenna height. Alternately or in combination with the reduced second antenna height, the second antenna can be a shaped-beam antenna in order to produce the selectively limited range.

In a typical embodiment, the upper layer signal comprises a legacy signal and the lower layer signal comprises a 2-VSB signal. However, the lower layer signal can alternately be a QPSK or other signal.

A typical receiver of the invention includes a first demodulator for demodulating an upper layer signal comprising an 8-VSB signal directly from a layered modulation signal and a second demodulator for demodulating a lower layer signal after subtracting the upper layer signal from the layered modulation signal. The layered modulation signal comprises both the upper layer signal and a lower layer signal both interfering in a common frequency band.

The upper layer signal can be subtracted from the layered modulation signal with a carrier of the upper layer signal included in the subtraction. Alternately, the upper layer signal can be subtracted from the layered modulation signal with the carrier of the upper layer signal removed before the subtraction.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. ATSC Terrestrial Transmission Characteristics

Figure 1:
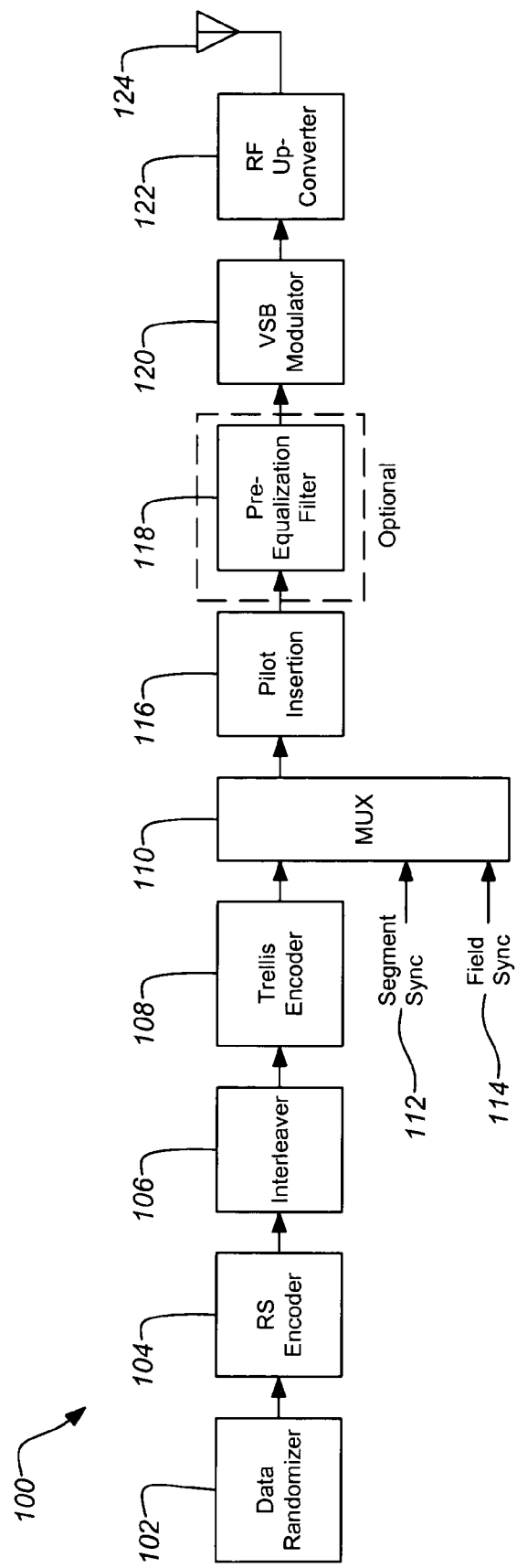
FIG. 1 shows a functional block diagram of a representative terrestrial broadcast transmitter for the ATSC digital TV standard.

FIG. 1 shows a functional block diagram of a representative terrestrial broadcast transmitter 100 for the ATSC advanced television (ATV) digital standard. The ATSC uses a terrestrial broadcast mode (known as 8 VSB) to support a payload data rate of 19.28 Mbps in a 6 MHz channel. The input to the transmission subsystem from the transport subsystem is a 19.39 Mbps serial data stream comprising 188-byte MPEG-compatible data packets (including a sync byte and 187 bytes of data which represent a payload data rate of 19.28 Mbps).

The incoming data is randomized and then processed for forward error correction (FEC) in the form of Reed-Solomon (RS) coding (20 RS parity bytes are added to each packet), 1/6 data field interleaving and 2/3 rate trellis coding. The randomization and FEC processes are not applied to the sync byte of the transport packet, which is represented in transmission by a data segment sync signal as described below. Following randomization and forward error correction processing, the data packets are formatted into Data Frames for transmission and Data Segment Sync and Data Field Sync are added.

Figure 2:
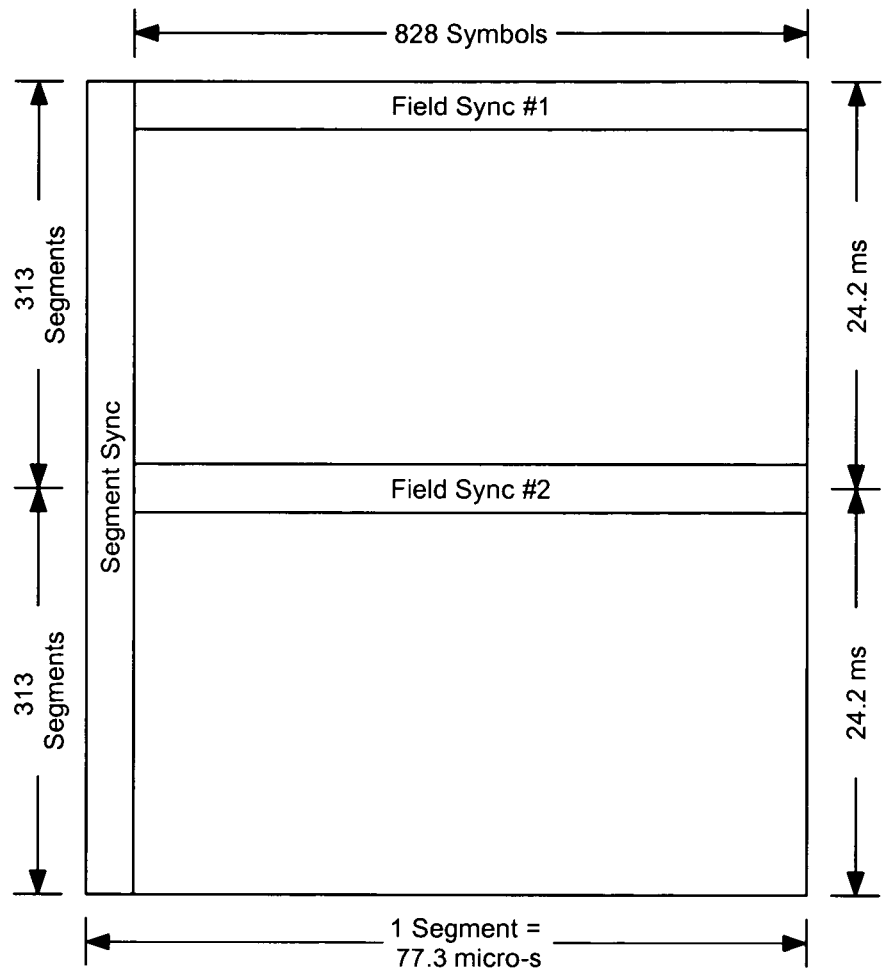
FIG. 2 shows ATSC digital TV data organization for transmission.

FIG. 2 shows how the data are organized for transmission. Each data frame comprises two data fields, each containing 313 data segments. The first data segment of each data field is a unique synchronizing signal (data field sync) and includes the training sequence used by the equalizer in the receiver. The remaining 312 data segments each carry the equivalent of the data from one 188-byte transport packet plus its associated FEC overhead. The actual data in each data segment comes from several transport packets because of data interleaving. Each data segment consists of 832 symbols. The first 4 symbols are transmitted in binary form and provide segment synchronization. This data segment sync signal also represents the sync byte of the 188-byte MPEG-compatible transport packet. The remaining 828 symbols of each data segment carry data equivalent to the remaining 187 bytes of a transport packet and its associated FEC overhead. These 828 symbols are transmitted as 8-level signals and therefore carry three bits per symbol. Thus, 828×3=2484 bits of data are carried in each data segment, which exactly matches the requirement to send a protected transport packet: 187 data bytes+20 RS parity bytes=207 bytes, 207 bytes×8 bits/byte=1656 bits and 2/3 rate trellis coding requires 3/2×1656 bits=2484 bits. The symbol rate in MHz is given by $$S_r(\text{MHz}) = \frac{4.5}{286} \times 684 = 10.76,$$

which is twice of 5.38 MHz for a single-sideband (SSB) signal The frequency of a data segment (in data segments/s) is given by $$f_{seg} = \frac{S_r}{832} = 12.94 \times 10^3.$$

The data frame rate (in frames/s) is given by $$f_{frame} = \frac{f_{seg}}{626} = 20.66.$$

The symbol rate and the transport rate are locked to each other in frequency.

Figure 3:
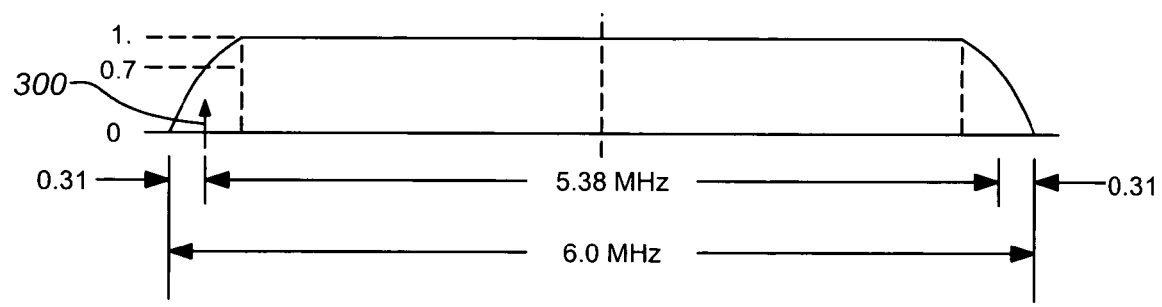
FIG. 3 illustrates a VSB channel spectrum.

FIG. 3 shows the nominal VSB transmission spectrum. The 8-level symbols combined with the binary data segment sync and data field sync signals shall be used to suppressed-carrier modulate a single carrier. Before transmission, however, most of the lower sideband shall be removed. The resulting spectrum is flat, except for the band edges where a nominal square root raised cosine response results in 620 kHz transition regions. At the suppressed-carrier frequency, 310 kHz from the lower band edge, a small pilot 300 is added to the signal.

Referring back to FIG. 1, all payload data is carried with the same priority. A data randomizer 102 is used on all input data to randomize the data payload (not including data field sync or data segment sync, or RS parity bytes). The data randomizer 102 XORs all the incoming data bytes with a 16-bit maximum length pseudo random binary sequence (PRBS) which is initialized at the beginning of the data field. The PRBS is generated in a 16-bit shift register that has nine feedback taps. Eight of the shift register outputs are selected as the fixed randomizing byte, where each bit from this byte is used to individually XOR the corresponding input data bit. The data bits are XORed most significant bit (MSB) to MSB, least significant bit (LSB) to LSB, etc. The data randomizer 102 generator polynomial is $G_{(16)}=X^{16}+X^{13}+X^{12}+X^{11}+X^{7}+$ $X^6+X^3+X+1$. The initialization (pre-load) of the randomizer to F180 hex (load to 1) occurs during the data segment sync interval prior to the first data segment.

The data randomizer 102 is coupled to a Reed-Soloman encoder 104. The RS code used in the VSB transmission subsystem shall be a t=10 (207,187) code. The RS data block size is 187 bytes, with 20 RS parity bytes added for error correction. A total RS block size of 207 bytes is transmitted per data segment. In creating bytes from the serial bit stream, the MSB shall be the first serial bit. The 20 RS parity bytes shall be sent at the end of the data segment.

The interleaver 106 employed in the VSB transmitter 100 can be a 52 data segment (intersegment) convolutional byte interleaver 106. Interleaving is provided to a depth of about 1/6 of a data field (4 ms deep). Only data bytes are interleaved. The interleaver shall be synchronized to the first data byte of the data field. Intrasegment interleaving is also performed for the benefit of the trellis coding process performed later.

Following the interleaver 106, data is passed to the trellis encoder 108 which includes a precoder and symbol mapper. The 8 VSB trellis encoder 108 employs a ⅔ rate (R=⅔) trellis code (with one unencoded bit which is precoded). That is, one input bit is encoded into two output bits using a ½ rate convolutional code while the other input bit is precoded. The signaling waveform used with the trellis code is an 8-level (3 bit) one-dimensional constellation. Thus, the transmitted signal is referred to as 8 VSB. A four-state trellis encoder is used and trellis code intrasegment interleaving is used. This employs twelve identical trellis encoders 108 and precoders operating on interleaved data symbols. (The overall trellis encoder and the individual 12 encoder are both referenced as 108.) The code interleaving is accomplished by encoding symbols (0, 12, 24, 36 . . . ) as one group, symbols (1, 13, 25, 37, . . . ) as a second group, symbols (2, 14, 26, 38, . . . ) as a third group, and so on for a total of 12 groups.

In creating serial bits from parallel bytes, the MSB is sent out first: (7, 6, 5, 4, 3, 2, 1, 0). The MSB is precoded (7, 5, 3, 1) and the LSB is feedback convolutional encoded (6, 4, 2, 0). Standard four-state optimal Ungerboeck codes shall be used for the encoding. The trellis code utilizes the four-state feedback encoder. The trellis code and precoder intrasegment interleaver feeds the symbol mapper. Data bytes are fed from the byte interleaver 106 to the trellis encoder 108 and precoder, and they are processed as whole bytes by each of the twelve encoders 108. Each byte produces four symbols from a single encoder 108. The value of 1.25 is added to all these nominal levels after the bit-to-symbol mapping function for the purpose of creating a small pilot carrier, discussed hereafter.

Following the trellis encoder 108 the output multiplexer 110 advances by four symbols on each segment boundary. However, the state of the trellis encoder 108 shall not be advanced. The data coming out of the multiplexer 110 shall follow normal ordering from encoder 0 through 11 of the trellis encoder 108 for the first segment of the frame, but on the second segment the order changes and symbols are read from encoders 4 through 11, and then 0 through 3 of the trellis encoder 108. The third segment reads from encoder 8 through 11 and then encoder 0 through 7 of the trellis encoder 108. This three-segment pattern shall repeat through the 312 data segments of the frame. After the data segment sync 112 is inserted, the ordering of the data symbols is such that symbols from each encoder 108 occur at a spacing of twelve symbols.

A complete conversion of parallel bytes to serial bits needs 828 bytes to produce 6624 bits. Data symbols are created from 2 bits sent in MSB order, so a complete conversion operation yields 3312 data symbols, which corresponds to 4 segments of 828 data symbols. 3312 data symbols divided by 12 trellis encoders 108 gives 276 symbols per trellis encoder 108. 276 symbols divided by 4 symbols per byte gives 69 bytes per trellis encoder 108. The conversion starts with the first segment of the field and proceeds with groups of 4 segments until the end of the field. The 312 segments per field divided by 4 gives 78 conversion operations per field. During segment sync 112 the input to 4 encoders 108 is skipped and the trellis encoders 108 cycle with no input. The input is held until the next multiplex cycle and then fed to the correct trellis encoder 108.

The encoded trellis data shall be passed through a multiplexer 110 that inserts the various synchronization signals (data segment sync 112 and data field sync 114). A two-level (binary) four-symbol data segment sync 112 is inserted into the 8-level digital data stream at the beginning of each data segment. (The MPEG sync byte shall be replaced by data segment sync 112.)

A complete data segment comprises 832 symbols: 4 symbols for data segment sync 112, and 828 data plus parity symbols. The data segment sync 112 is binary (2-level). The same sync pattern occurs regularly at 77.3 µs intervals, and is the only signal repeating at this rate. Unlike the data, the four symbols for the data segment sync 112 are not Reed-Solomon, trellis encoded or interleaved. The data segment sync 112 pattern is a 1001 pattern.

The data are not only divided into data segments, but also into data fields, each comprising 313 segments. Each data field (24.2 ms) begins with one complete data segment of data field sync 114. Each symbol represents one bit of data (2-level). Like the data segment sync 112, the field sync 114 is not Reed-Solomon, trellis encoded or interleaved.

Following the multiplexer 110, a small in-phase pilot signal 300 is added to the data signal in the pilot insertion block 116. The frequency of the pilot signal 300 shall be the same as the suppressed-carrier frequency as shown in FIG. 3. This may be generated in the following manner. A small (digital) dc level (e.g. 1.25 V) can be added to every symbol (data and sync) of the digital baseband data plus sync signal (+1, +3, +5, +7). The power of the pilot signal 300 is approximately 11.3 dB below the average data signal power. Following the pilot insertion block 116, the signal can be optionally passed to a pre-equalizer filter 118.

Following the pilot insertion block 116 (and optional pre-equalizer filter 118), the VSB modulator 120 receives the 10.76 Msymbols/s, 8-level trellis encoded composite data signal (with the pilot and sync signals added). The ATV system performance is based on a linear phase raised cosine Nyquist filter response in the concatenated transmitter 100 and receiver, as shown in FIG. 3. The system filter response is essentially flat across the entire band, except for the transition regions at each end of the band. Nominally, the roll-off in the transmitter 100 shall have the response of a linear phase root raised cosine filter. As known in the art, the conventional receiving process of the 8-VSB essentially performs the reverse of the transmission processes in a reverse order.

2. Layered Modulation in Advanced Television Systems Committee (ATSC) Applications Embodiments of the present invention apply the principle of layered modulation, as detailed in U.S. Utility application Ser. No. 09/844,401, filed Apr. 27, 2001, by Ernest C. Chen, entitled "LAYERED MODULATION FOR DIGITAL SIGNALS," which is incorporated by reference herein, to the 8-VSB terrestrial broadcast format of the ATSC standard described above.

Applying layered modulation to the 8-VSB signal, embodiments of the present invention introduce a new signal with a reduced power (a lower layer VSB signal) transmitted simultaneously over the legacy 8-VSB signal. The legacy signal can now be viewed as an upper layer signal in a layered modulation system. Existing receivers will continue to receive the upper layer signal without being "aware" of the presence of the new signal; the lower layer signal is ignored as "noise" in legacy receivers. However, new layered modulation VSB receivers can receive and process both the new lower layer signal and the legacy signal. The result is an increased throughput for the new layered modulation VSB receivers. Although layered modulation increase spectral efficiency over the allocated bandwidth, it generally requires a higher carrier to noise ratio (CNR) for the legacy VSB signal in order to insert the lower layer VSB signal.

As terrestrial broadcasting inherently carries a higher CNR at closer distances to the transmitter (following $1/R^2$ rule and an antenna receive pattern), in some embodiments, the new lower layer VSB signal may be designed with a shorter maximum range than that of the legacy VSB signal, if it is desirable to limit the impact of the new VSB service on the maximum range performance of the legacy VSB service. This can be achieved through several techniques. For example, one technique is to reduce the height of the transmit antenna, resulting in a shorter horizon range. Another techniques is to point the antenna with a larger depression angle, avoiding most energy from the lower layer signal into the legacy signal at long ranges. Still another technique is to generally re-shape the antenna elevation pattern to provide the desirable power separation between the legacy VSB signal and the new lower layer VSB signal and minimize the impact on the legacy signal operation.

Figure 4:
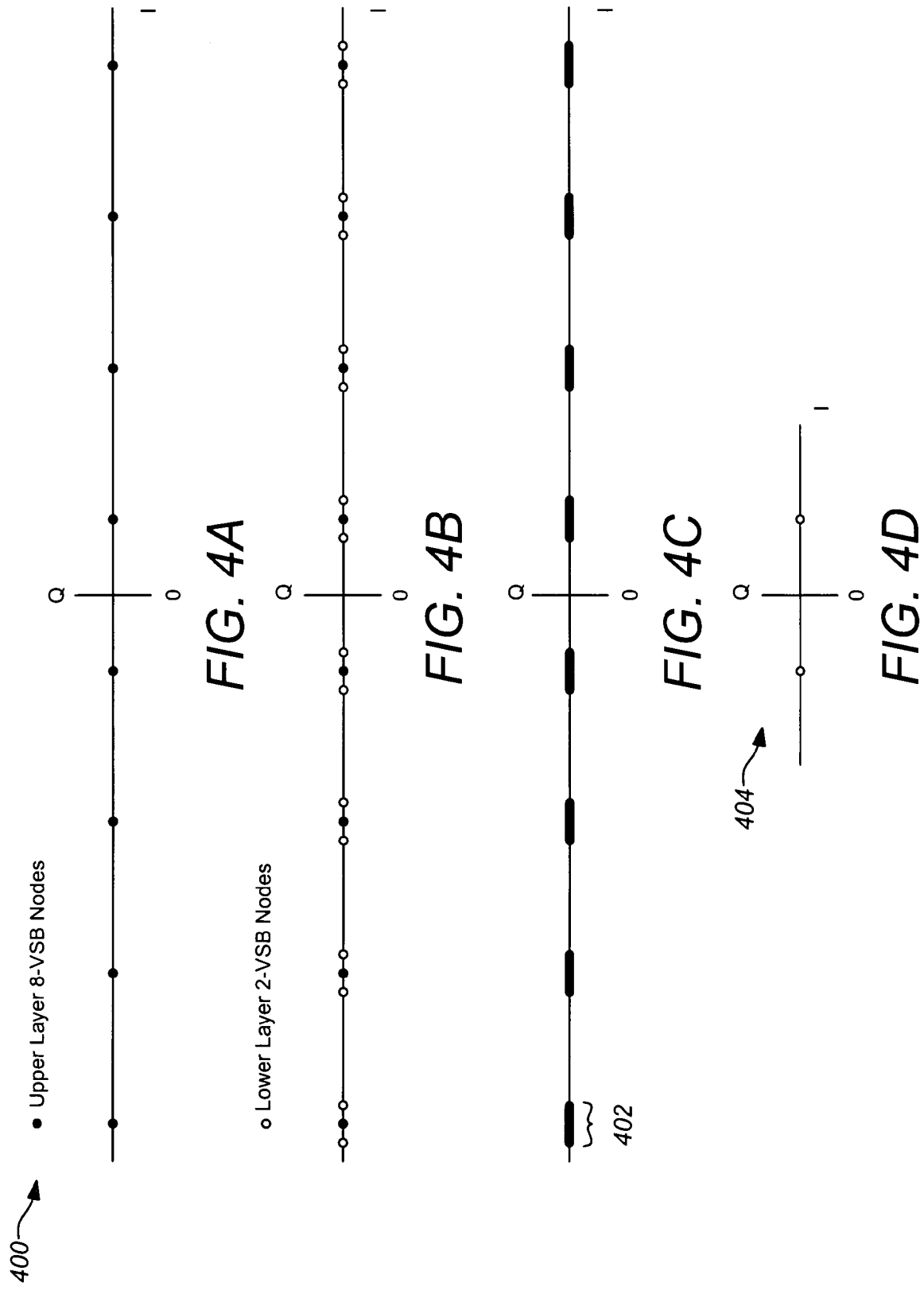
FIGS. 4A-4D illustrates the relationship between the upper layer legacy 8-VSB symbol constellation and the lower layer 2-VSB signal.

FIGS. 4A-4D illustrates the relationship between the upper layer legacy 8-VSB symbol constellation 400 and the lower-layer 2-VSB signal. FIG. 4A illustrates the upper layer 8-VSB symbol constellation 400 alone which is generated as previously discussed. The 8-VSB nodes are equally spaced on the in-phase (I) axis by themselves. Only the processed in-phase component is shown in the diagrams because the quadrature (Q) component does not carry information. FIG. 4B illustrates the new lower layer 2-VSB symbol constellation superimposed over the upper layer 8-VSB symbol constellation 400. Adding the 2-VSB signal perturbs the eight upper layer nodes with uncertainties proportional to the strength of the lower layer 2-VSB signal relative to that of the 8-VSB signal. FIG. 4C illustrates the influence of the lower layer 2-VSB signal as perceived by a legacy 8-VSB receiver (and in the upper layer demodulation of new receiver). The lower layer 2-VSB signal appears as additional noise varying the positions of the 8-VSB node positions to appear as ranges 402 to the legacy receiver. However, the eight levels of the legacy signal can still be distinguished so the signal is still acceptable. On the other hand, in a new receiver, the ideal 8-VSB signal is reconstructed and subtracted from the received signal to expose the 2-VSB signal for further lower layer processing. FIG. 4D illustrates the 2-VSB symbol constellation 404 after successful subtraction of the upper layer 8-VSB signal from the composite signal. Note that the upper and lower layer signals are designed to occupy a common frequency band. That is, they interfere within the common frequency band. However, the nominal frequencies of the upper and lower layer signals need not be identical. In fact, the lower layer signal frequency can be offset from the upper layer signal frequency to improve performance although the signals still interfere with one another.

It should also be noted that the lower layer signal may be implemented with other modulation formats, e.g. QPSK, so long as the signal remains contained within the designated bandwidth.

Figure 5:
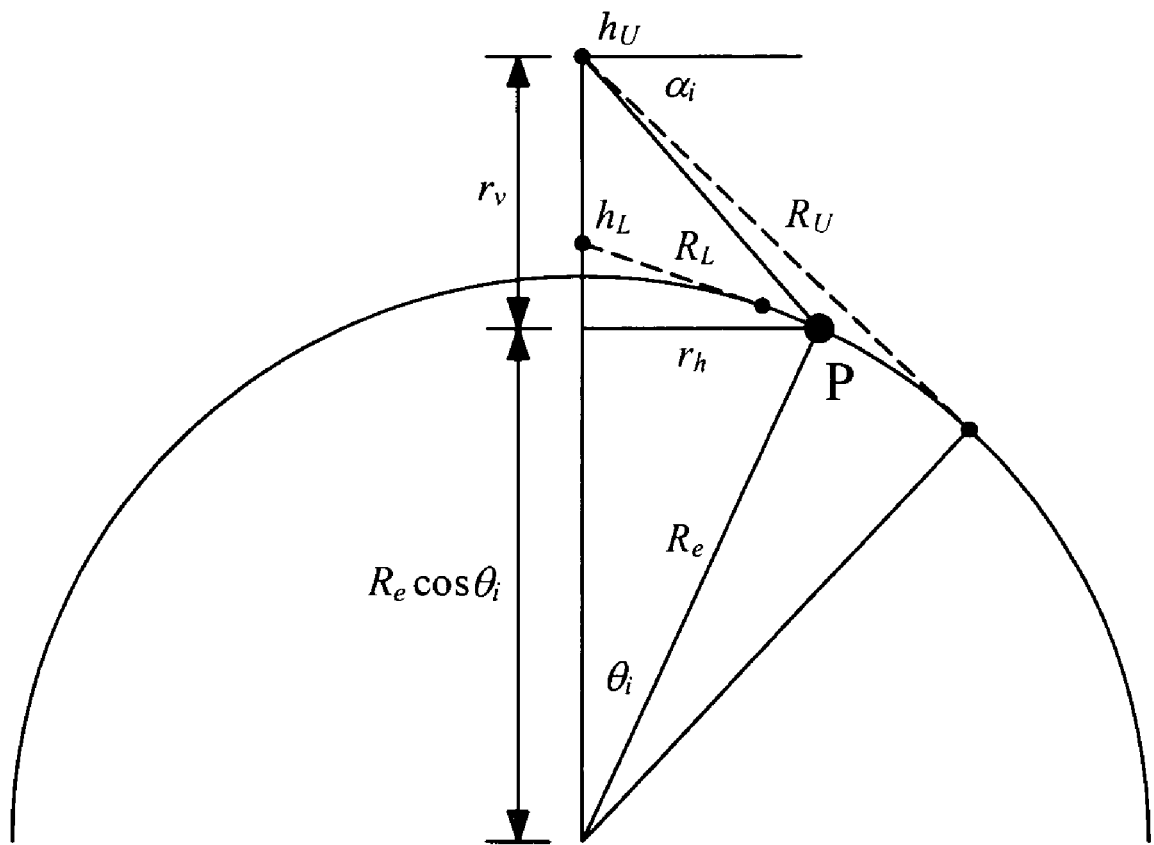
FIG. 5 illustrates the geometry used to calculate antenna gain for exemplary CNR performance curves.

FIG. 5 illustrates the geometry used to calculate antenna gain for exemplary performance curves. A 4/3 Earth model is adopted to account for the fact that an electromagnetic wave propagates through air layers of different densities and diffracts in a downward fashion. Thus, the effective Earth radius, as perceived by the wave, is 4/3 times the actual radius of 3960 mi, or 5280 mi. The radio horizon range is approximately proportional to the square root of the transmit antenna height. For example, an antenna ¼ of the height would reach ½ of the horizon range.

In the examples discussed below, the antennas transmitting the respective upper and lower layer signals are assumed to point to their respective radio horizons for maximum range performance. For simplicity in the analysis, the near-in antenna gain pattern is assumed to be quadratic in dB as a function of angle from the antenna boresight. As shown in FIG. 5, $h_U$ is the height of the upper layer signal antenna (for transmitting the 8-VSB legacy signal), $h_L$ is the height of the lower layer signal antenna (e.g. for transmitting a 2-VSB signal). $R_U$ is the radio horizon range to the upper layer signal antenna and $R_L$ is the radio horizon range to the lower layer signal antenna. $R_e$ is the effective Earth radius, 5280 miles with the 4/3 Earth model, and $\theta_i$ is the geocentric angle to the ground point, P. The following equations relate the geometry of FIG. 5.

$$R_U \approx \sqrt{2R_e h_U} \quad (1)$$

$$R_L \approx \sqrt{2R_e h_L} \quad (2)$$

$$r_v = h_U + R_e(1 - \cos\theta_i) \quad (3)$$

$$r_h = R_e \sin\theta_i \quad (4)$$

$$\alpha_i = \tan^{-1}\frac{r_v}{r_h} \quad (5)$$

Thus, the elevation angle to the bore-sight $\alpha_i$ (as measured from the horizontal line through the antenna) can be calculated for the ground point P at geocentric angle $\theta_i$. The antenna bore-sight angle $\alpha_i$ can be used to calculate the angle off the bore-sight and therefore the antenna gain at Point P.

Figure 6A:
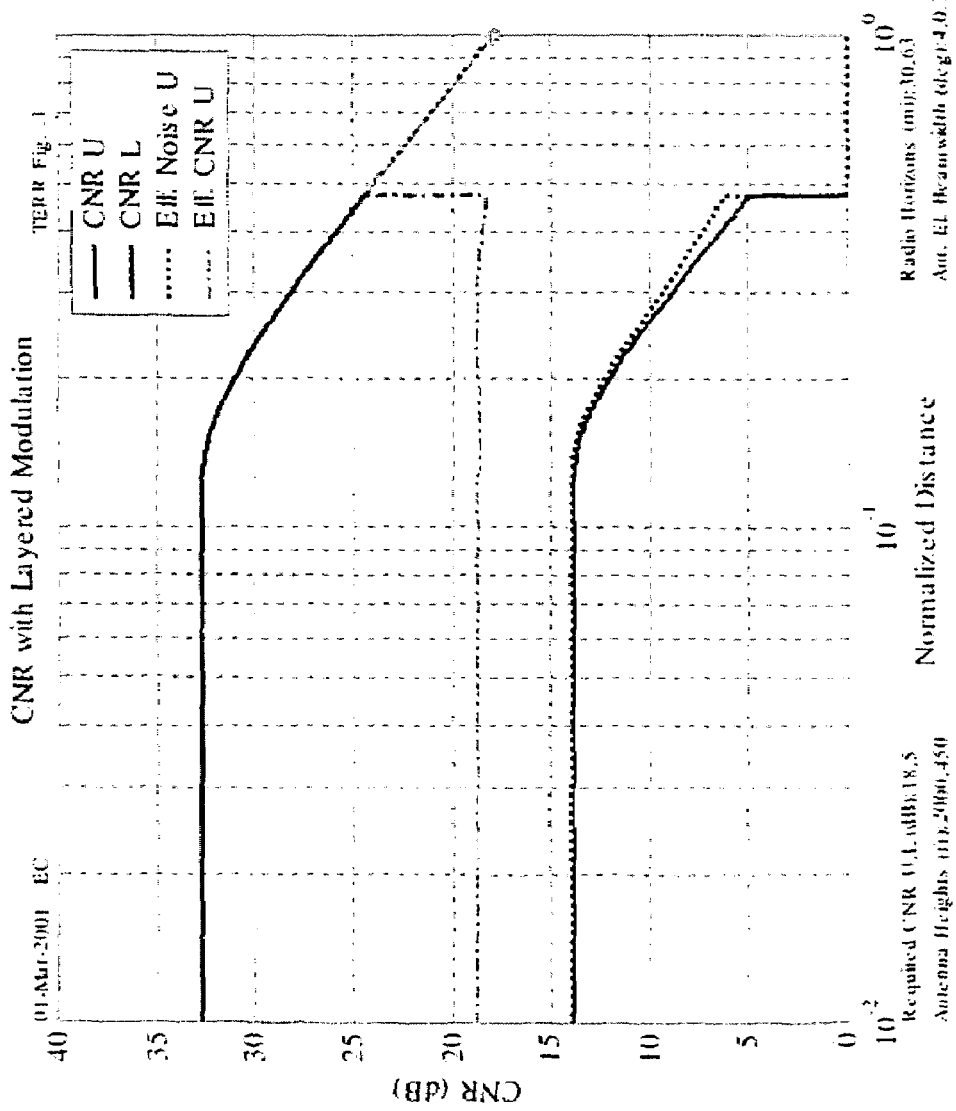
FIGS. 6A & 6B illustrate an exemplary CNR with the insertion of a lower layer VSB signal over the legacy VSB signal.
Figure 6B:
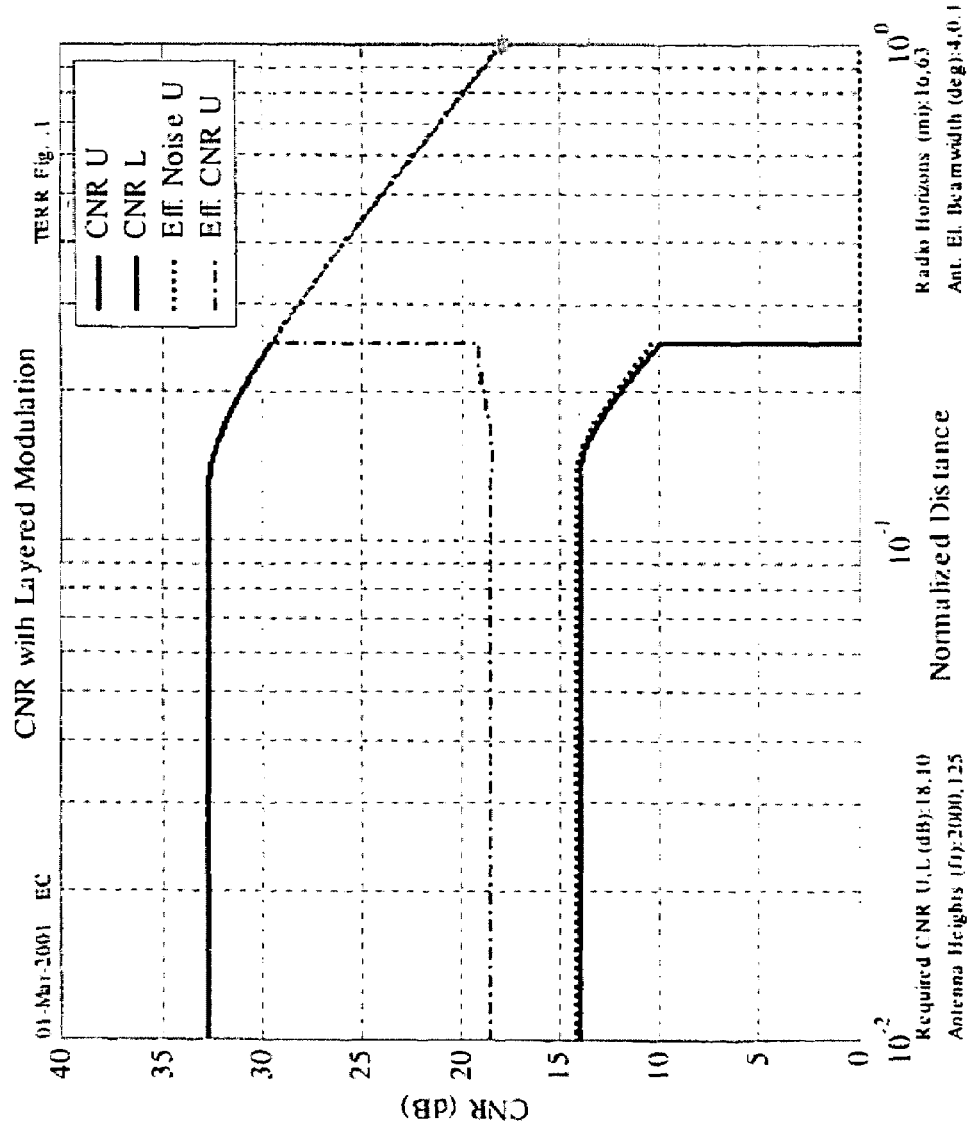

FIGS. 6A & 6B illustrate examples for CNR with the insertion of a lower layer VSB signal over the legacy 8-VSB signal. The examples are not intended to impose specific antenna pattern requirements for the invention method. Rather, they serve to demonstrate how the invention might work.

FIG. 6A plots an example scenario with the CNR values from two antenna heights of 2000 and 450 ft with corresponding horizon ranges of 63 and 30 mi. This example has the upper layer antenna hit a horizon range with a CNR of 18 dB which is the assumed requirement for ATSC VSB-8 modulation. Similarly, the lower layer antenna hits a horizon range with a CNR of 5 dB which is the assumed requirement for a 2-VSB modulation with turbo coding and a code rate of 3/4. The CNR curves are principally determined by two factors: the $1/R^2$ from range effect and the antenna gain off bore-sight. For simplicity, the antenna gain is assumed to have such a shape that it combines with the $1/R^2$ factor to result in a constant CNR at near-in range. Since the lower layer carrier power and thermal noise combine to form the perceived noise floor for upper layer signal, the CNR for the upper layer signal is the difference between the upper signal power and this noise floor, as shown in FIG. 6A. The CNR for the upper layer signal achieves the required value of 18 dB up to its horizon range of 63 mi. Similarly, the CNR for the lower layer signal achieves the required value of 5 dB up to its horizon range of 30 mi. The lower layer signal does not reduce the maximum range of the upper layer signal.

FIG. 6B shows a different example with a required CNR of 10 dB for the lower layer signal. In this case more throughput from the new service is provided than the previous example of FIG. 6A. All other parameters being unchanged from those of FIG. 6A, the maximum range for the lower layer signal is shown to be reduced to approximately 16 mi., the horizon range for the designed antenna height of 125 ft. Performance of the legacy receiver remains unchanged.

Figure 7:
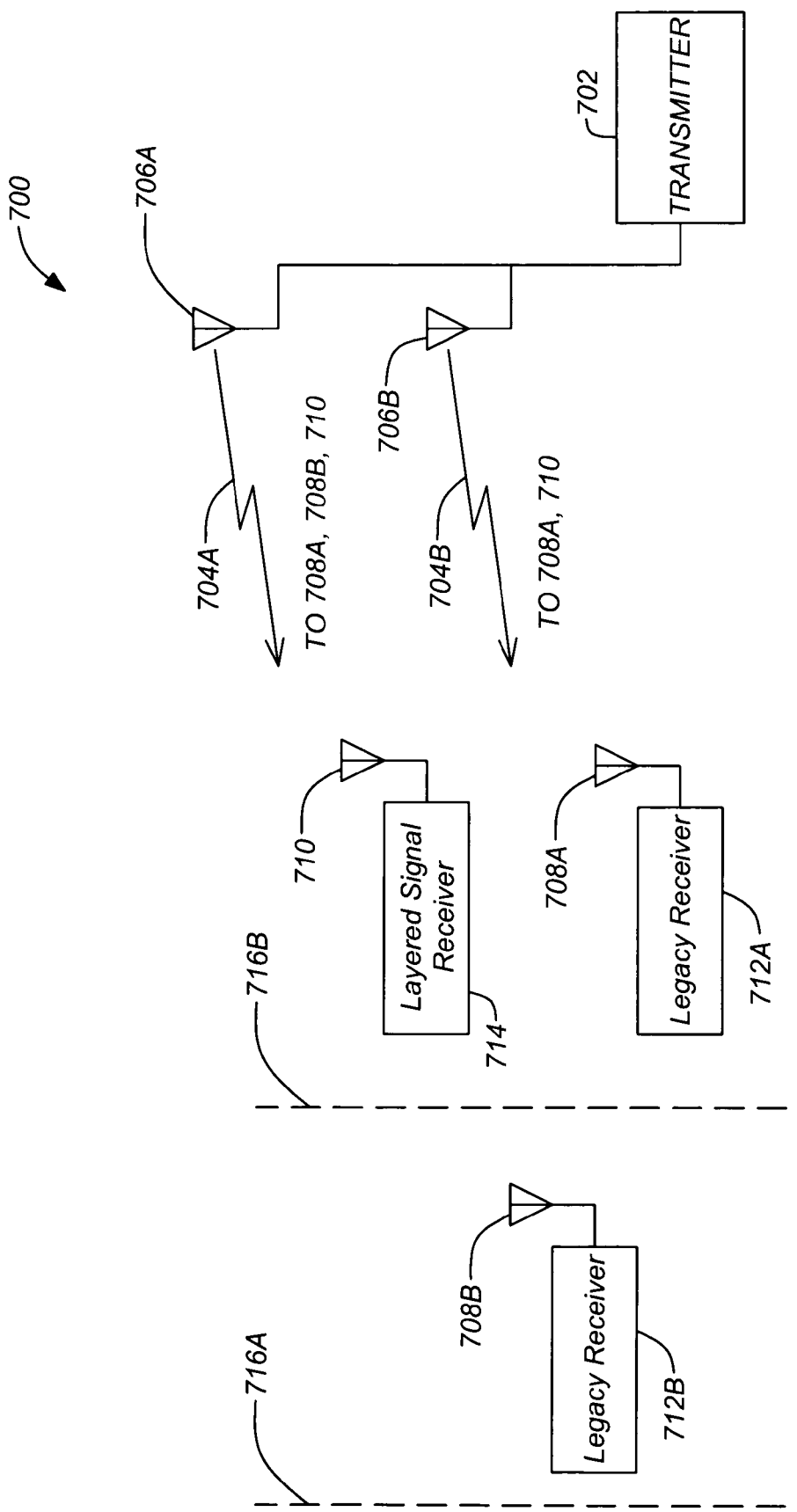
FIG. 7 illustrates a exemplary system architecture of the invention.

FIG. 7 illustrates an exemplary system architecture of the invention. The system 700 includes one or more transmitters 702 for transmitting both the legacy upper layer 8-VSB signal 704A and the new lower layer signal 704B. The upper layer signal 704A is transmitted from a first antenna 706A and the lower layer signal 704B is transmitted from a second antenna 706B. The second antenna 706B for the lower layer signal 704B can be disposed a lower height than the first antenna 706A in order to provide a selective range limit 716B of the lower layer signal 704B to be less than the range limit 716A of the upper layer signal 704A. The lower layer signal range limit 716B is selectively limited so that the lower layer signal 704B does not interfere with the upper layer signal 706B in a range 718 where the lower layer signal 704B could not be received anyway (no or little physical transmitter illumination beyond 716B). Thus, by applying the selective range limit 716B to the lower layer signal 704B, the upper layer signal 704A can still be received out to its range limit 716A. Alternately (or in conjunction with the lower height of the second antenna 706B), the selective range limit 716B can be achieved through the use of a shaped antenna known to those skilled in the art.

Thus, the layered signal, comprising both the upper layer signal 704A and the lower layer signal 704B, is transmitted only out to the selective range limit 716B (the second antenna 706B range of the lower layer signal 704B). Within this range limit 716B, a first legacy antenna 708A and legacy receiver 712A can receive and decode the upper layer legacy signal 704A from the layered signal (ignoring the lower layer signal 704B as noise). In addition, a layered signal antenna 710 and layered signal receiver 714 can receive and decode both the upper layer signal 704A and the lower layer signal 704B within this selective range limit 716B. Beyond this selective range limit 716B and out to the upper layer signal rang limit 716A, a second legacy antenna 708B and legacy receiver 708B can still receive and decode the upper layer signal 704A.

Some further design factors should be considered in order to maximize the overall range performance of the system 700. In some embodiments of the invention the lower layer antenna height can be reduced. This results in a shortened horizon range, which avoids potential performance impact on the long range upper layer signal within the horizon of the lower layer signal antenna as related to the discussion in the examples of FIGS. 6A & 6B above. In other embodiments, the upper layer signal power can be increased. This leaves more "breathing room" for the lower layer signal power to grow, which can in turn support a longer horizon (by raising the lower layer antenna height) or service range for the lower layer service.

Figure 8A:
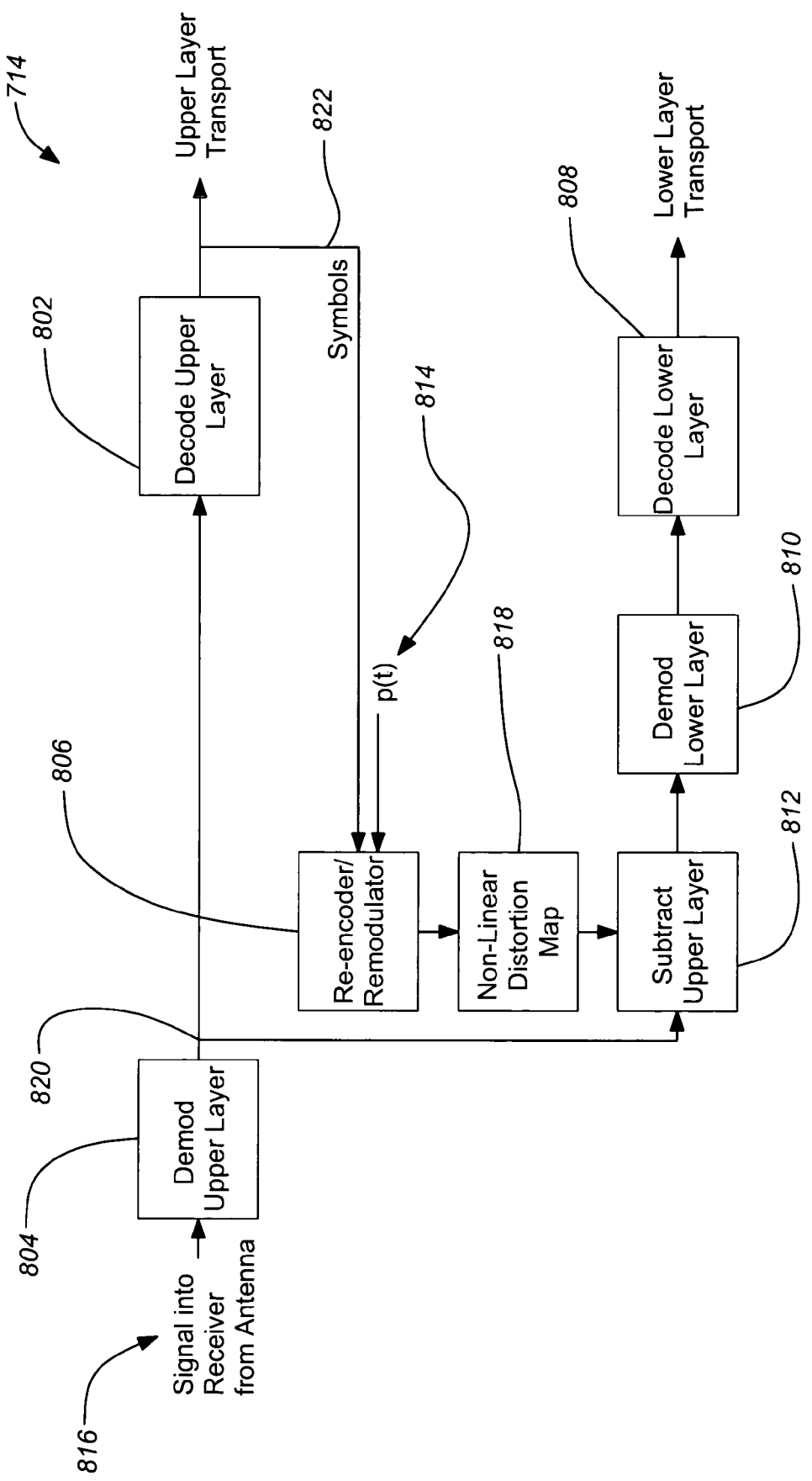
FIGS. 8A & 8B illustrate exemplary receivers of the invention.
Figure 8B:
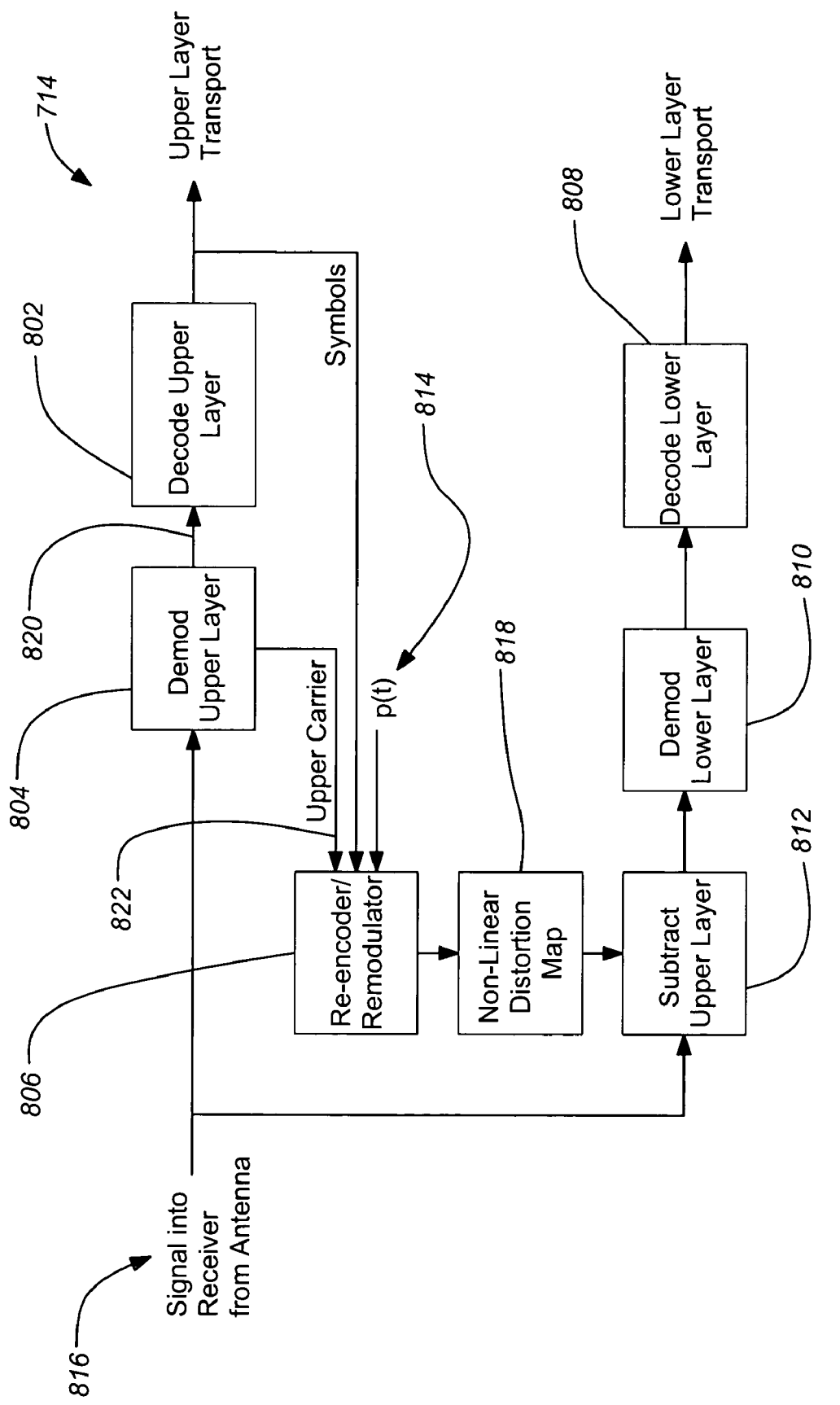

FIGS. 8A & 8B are alternate block diagrams for reception of a layered modulation signal by a typical layered receiver 714 of the present invention. FIG. 8A depicts reception where layer subtraction is performed on a signal after the upper carrier has been demodulated. The upper layer 8-VSB signal of the received layered signal 816 is processed by a demodulator 804 to produce the stable demodulated signal output 820. The demodulated signal is fed to a decoder 802 which decodes the upper layer. The upper layer decoder 802 produces the upper layer symbols which are output to an upper layer transport and also used to generate an idealized upper layer signal. The upper layer symbols may be produced from the decoder 802 for example after Reed-Solomon (RS) decode (BER<$10^{-9}$ or so), in typical decoding operations for the ATSC 8-VSB legacy signal 704A. The upper layer symbols from the upper layer decoder 802 are fed to an re-encoder/remodulator 806 which effectively produces an idealized upper layer signal for subtraction from the stable demodulated signal 820.

In order for the subtraction to leave a suitable lower layer signal 704B, the upper layer legacy signal 704A must be precisely reproduced. The modulated signal may have been distorted, for example, by amplifier non-linearity in transmission. These and other distortion effects can be estimated from the received signal after the fact or from amplifier characteristics which can be downloaded into the receiver in AM-AM and/or AM-PM maps 818, which are used to eliminate the distortion.

A subtractor 812 then subtracts the idealized upper layer signal from the stable demodulated signal 820. This leaves the lower layer signal 704B. The subtractor includes a buffer or delay function to retain the stable demodulated signal 820 while the idealized upper layer signal 704A is being reconstructed. The lower layer signal 704B is demodulated 810 and decoded 808 according to its signal format.

FIG. 8B depicts reception where alternately layer subtraction is performed on the received layered signal. In this case, the demodulator 804 produces the carrier of the upper layer legacy 8-VSB signal 704A (as well as the stable demodulated signal output 820). The upper layer carrier signal is output to the re-encoder/remodulator 806, which effectively produces an idealized upper layer signal which includes the upper layer carrier for subtraction from the received combined signal 816. Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through re-encoding/remodulation from their respective layer symbols and subtracted. Subtraction may be performed on either the received combined signal or a demodulated signal. Finally, it should be noted that it is not necessary for the lower layer signal to be a digital transmissions, particularly 2-VSB); the lower layer signal may be an analog transmission or other digital formats as well.

Figure 9A:
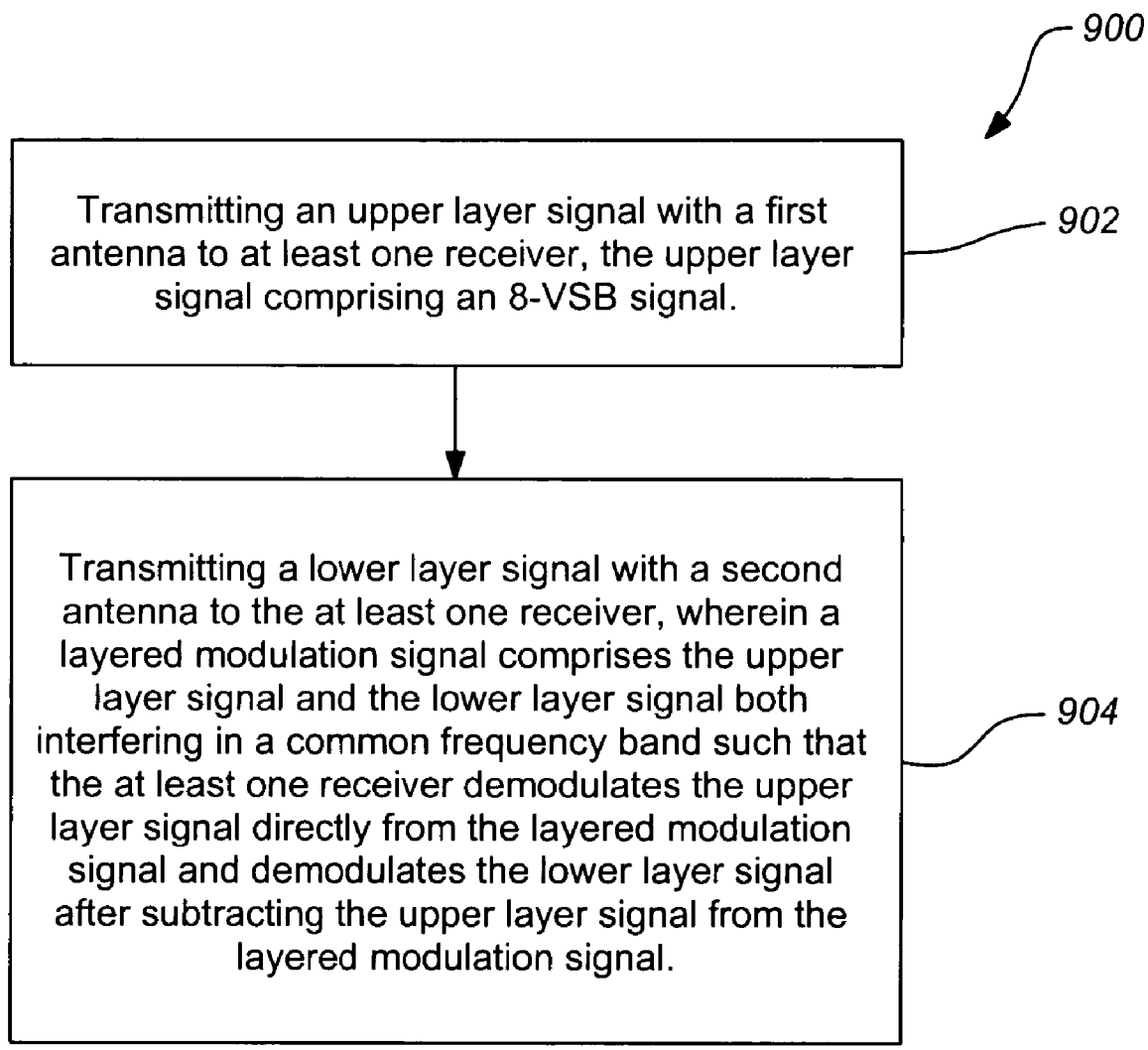
FIGS. 9A & 9B illustrates exemplary methods of the invention.

FIG. 9A illustrates an exemplary transmission method 900 of the invention. At step 902, an upper layer signal is transmitted with a first antenna to at least one receiver, the upper layer signal comprising an 8-VSB signal. At step 904, a lower layer signal is transmitted with a second antenna to the at least one receiver, wherein a layered modulation signal comprises the upper layer signal and the lower layer signal both interfering in a common frequency band such that the at least one receiver demodulates the upper layer signal directly from the layered modulation signal and demodulates the lower layer signal after subtracting the upper layer signal from the layered modulation signal. The method 900 can be further modified consistent with the transmission system previously described.

Figure 9B:
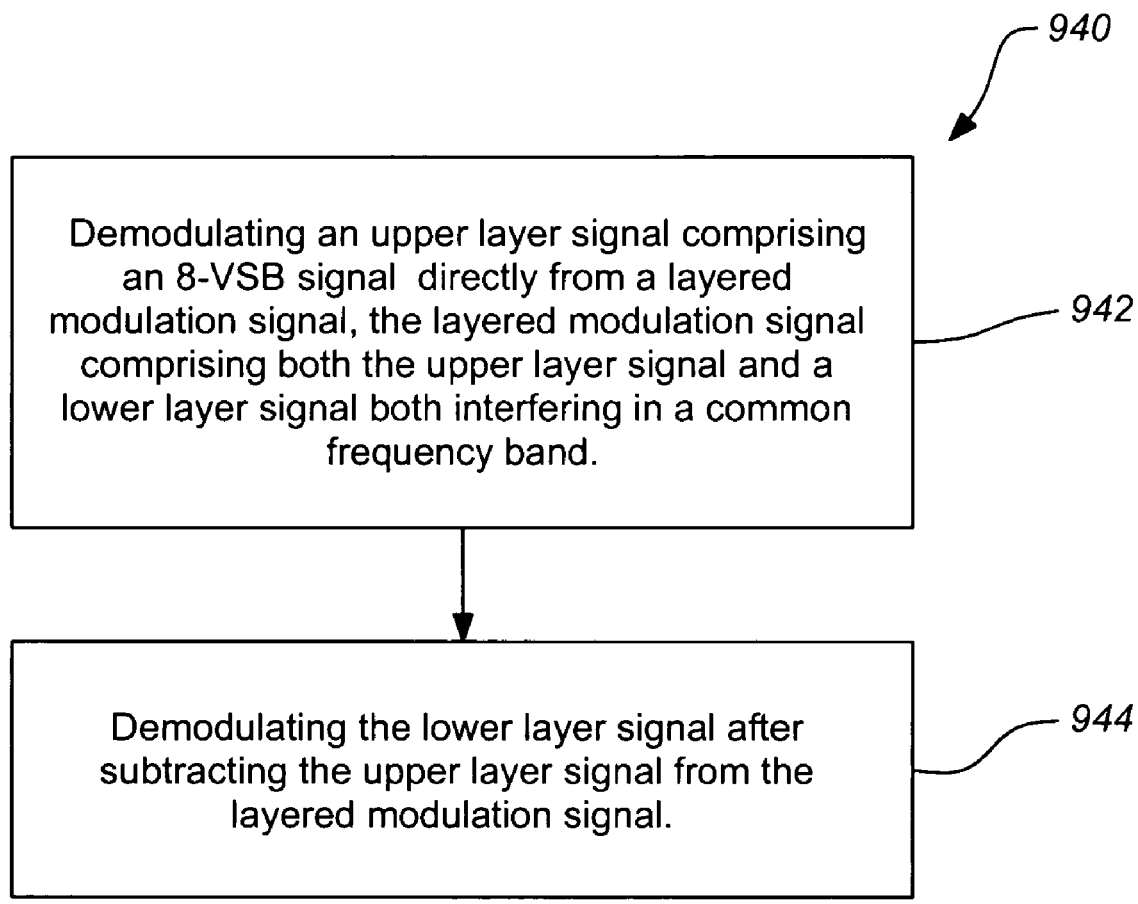

FIG. 9B illustrates an exemplary receiving method 940 of the invention. At step 942, an upper layer signal comprising an 8-VSB signal is demodulated directly from a layered modulation signal, the layered modulation signal comprising both the upper layer signal and a lower layer signal both interfering in a common frequency band. At step 944, the lower layer signal is demodulated after subtracting the upper layer signal from the layered modulation signal. The method 940 can be further modified consistent with the receiver systems previously described.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A system for transmitting signals, comprising:
    a first antenna for transmitting an upper layer signal comprising an 8-VSB signal to at least one receiver; and
    a second antenna for transmitting a lower layer signal to the at least one receiver;
    wherein a layered modulation signal comprises the upper layer signal and the lower layer signal both interfering in a common frequency band such that the at least one receiver demodulates the upper layer signal directly from the layered modulation signal and demodulates the lower layer signal after subtracting the upper layer signal from the layered modulation signal.

2. The system of claim 1, wherein the upper layer signal comprises a legacy signal.

3. The system of claim 1, wherein the lower layer signal comprises a 2-VSB signal.

4. The system of claim 1, wherein the lower layer signal comprises a QPSK signal.

5. The system of claim 1, wherein the second antenna has a selectively limited range so that the lower layer signal does not interfere with the upper layer signal in a range where the lower layer signal could not be demodulated.

6. The system of claim 5, wherein the selectively limited range is produced by reducing a second antenna height relative to a first antenna height.

7. The system of claim 5, wherein the second antenna comprises a shaped-beam antenna in order to produce the selectively limited range.

8. A method for transmitting signals, comprising the steps of:
    transmitting an upper layer signal with a first antenna, the upper layer signal comprising an 8-VSB signal to at least one receiver; and
    transmitting a lower layer signal with a second antenna to the at least one receiver;
    wherein a layered modulation signal comprises the upper layer signal and the lower layer signal both interfering in common frequency band such that the at least one receiver demodulates the upper layer signal directly from the layered modulation signal and demodulates the lower layer signal after subtracting the upper layer signal from the layered modulation signal.

9. The method of claim 8, wherein the upper layer signal comprises a legacy signal.

10. The method of claim 8, wherein the lower layer signal comprises a 2-VSB signal.

11. The method of claim 8, wherein the lower layer signal comprises a QPSK signal.

12. The method of claim 8, further comprising selectively limiting a range of the second antenna so that the lower layer signal does not interfere with the upper layer signal in a range where the lower layer signal could not be demodulated.

13. The method of claim 12, wherein the second antenna range is selectively limited by reducing a second antenna height relative to a first antenna height.

14. The method of claim 12, wherein the second antenna comprises a shaped-beam antenna in order to selectively limit the range of the second antenna.

15. A system for receiving layered signals, comprising:
    a first demodulator for demodulating an upper layer signal comprising an 8-VSB signal directly from a layered modulation signal, the layered modulation signal comprising both the upper layer signal a lower layer signal both interfering in a common frequency band; and
    a second demodulator for demodulating a lower layer signal after subtracting the upper layer signal from the layered modulation signal.

16. The system of claim 15, wherein the upper layer signal is subtracted from the layered modulation signal with a carrier of the upper layer signal included in the subtraction.

17. The system of claim 15, wherein the upper layer signal is subtracted from the layered modulation signal with a carrier of the upper layer signal removed before the subtraction.

18. The system of claim 15, wherein the upper layer signal comprises a legacy signal.

19. The system of claim 15, wherein the lower layer signal comprises a 2-VSB signal.

20. The system of claim 15, wherein the lower layer signal comprises a QPSK signal.

21. A method for receiving layered signals, comprising:
    demodulating an upper layer signal comprising an 8-VSB signal directly from a layered modulation signal, the layered modulation signal comprising both the upper layer signal and a lower layer signal both interfering in a common frequency band; and
    demodulating the lower layer signal after subtracting the upper layer signal from the layered modulation signal.

22. The method of claim 21, wherein the upper layer signal is subtracted from the layered modulation signal with a carrier of the upper layer signal included in the subtraction.

23. The method of claim 21, wherein the upper layer signal is subtracted from the layered modulation signal with a carrier of the upper layer signal removed before the subtraction.

24. The method of claim 21, wherein the upper layer signal comprises a legacy signal.

25. The method of claim 21, wherein the lower layer signal comprises a 2-VSB signal.

26. The method of claim 21, wherein the lower layer signal comprises a QPSK signal.

27. A system for transmitting signals, comprising:
    means for transmitting an upper layer signal comprising an 8-VSB signal to at least one receiver; and
    means for transmitting a lower layer signal to the at least one receiver;

wherein a layered modulation signal comprises the upper layer signal and the lower layer signal both interfering in a common frequency band such that the at least one receiver demodulates the upper layer signal directly from the layered modulation signal and demodulates the lower layer signal after subtracting the upper layer signal from the layered modulation signal.

28. A system for receiving layered signals, comprising:

means for demodulating an upper layer signal comprising an 8-VSB signal directly from a layered modulation signal, the layered modulation signal comprising both the upper layer signal and a lower layer signal both interfering in a common frequency band; and means for demodulating a lower layer signal after subtracting the upper layer signal from the layered modulation signal.

* * * * *